US012701317B2

(12) United States Patent
Astvatsaturov et al.

(10) Patent No.: US 12,701,317 B2
(45) Date of Patent: Aug. 4, 2026

(54) SCANNER WINDOW WITH DISPLAY

(71) Applicant: ZEBRA TECHNOLOGIES CORPORATION, Lincolnshire, IL (US)

(72) Inventors: Yuri Astvatsaturov, Lake Forest, IL (US); Darran Michael Handshaw, Sound Beach, NY (US); Edward Barkan, Miller Place, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 27 days.

(21) Appl. No.: 18/821,756

(22) Filed: Aug. 30, 2024

(65) Prior Publication Data

US 2026/0067558 A1 Mar. 5, 2026

(51) Int. Cl.
| | |
|---|---|
| *H04N 23/63* | (2023.01) |
| *A47F 9/04* | (2006.01) |
| *G06K 7/10* | (2006.01) |
| *H04N 23/56* | (2023.01) |
| *H04N 23/667* | (2023.01) |

(52) U.S. Cl.
CPC ......... *H04N 23/63* (2023.01); *G06K 7/10722* (2013.01); *H04N 23/56* (2023.01); *H04N 23/667* (2023.01); *A47F 9/046* (2013.01)

(58) Field of Classification Search
CPC ...... H04N 23/63; H04N 23/56; H04N 23/667; G06K 7/10722; A47F 9/046
See application file for complete search history.

(56) References Cited

U.S. PATENT DOCUMENTS

| | | | | | |
|---|---|---|---|---|---|
| 4,928,301 | A | * | 5/1990 | Smoot | H04N 7/144 348/E7.08 |
| 5,612,734 | A | * | 3/1997 | Nelson | H04N 7/144 313/478 |
| 6,323,892 | B1 | * | 11/2001 | Mihara | H04N 7/144 348/14.08 |
| 7,367,499 | B2 | * | 5/2008 | Jwo | G01G 19/4144 235/462.14 |
| 7,581,680 | B2 | * | 9/2009 | Knowles | G06Q 30/06 235/462.11 |
| 9,058,531 | B2 | * | 6/2015 | Slutsky | G06K 7/1096 |
| 9,305,201 | B2 | * | 4/2016 | Barten | G01G 21/30 |
| 2009/0102763 | A1 | * | 4/2009 | Border | H04N 7/144 345/87 |

(Continued)

*Primary Examiner* — Chiawei Chen

(57) ABSTRACT

An apparatus to identify items in a transaction includes an imaging device with a housing having an exit window, an imaging assembly having a first imaging sensor, the imaging assembly having a first field of view (FOV) directed through the exit window, and a display assembly positioned to generate a display view on or through the exit window and positioned such that the display view is positioned to consume a first portion of the exit window that at least partially overlaps with a second portion of the exit window that is consumed by the first FOV. The apparatus may be configured to present a graphical user interface to a user and to accept input from the user to aid in identification of the items involved in the transaction. The imaging device may be used in a system which includes an illumination assembly and optionally a point-of-sale (POS) module.

16 Claims, 18 Drawing Sheets

(56) References Cited

U.S. PATENT DOCUMENTS

| | | | | |
|---|---|---|---|---|
| 2010/0147953 A1* | 6/2010 | Barkan | .............. | G06K 7/10693 |
| | | | | 235/462.41 |
| 2011/0019056 A1* | 1/2011 | Hirsch | ................. | H04N 5/2226 |
| | | | | 348/333.01 |
| 2011/0285891 A1* | 11/2011 | Maglaque | .............. | H04N 7/144 |
| | | | | 348/308 |
| 2012/0162490 A1* | 6/2012 | Chung | ................. | H04N 23/631 |
| | | | | 348/E5.037 |
| 2013/0135268 A1* | 5/2013 | Kanade | ................. | H04N 23/55 |
| | | | | 345/207 |
| 2014/0326787 A1* | 11/2014 | Barten | ................... | G01G 21/30 |
| | | | | 235/383 |
| 2015/0224243 A1* | 8/2015 | Elahi | ...................... | A61M 1/28 |
| | | | | 604/29 |
| 2017/0084231 A1* | 3/2017 | Chew | ....................... | G09G 3/20 |
| 2020/0137314 A1* | 4/2020 | Miao | ...................... | H04N 23/54 |
| 2020/0191812 A1* | 6/2020 | Dilks | ................. | G06K 7/10861 |
| 2022/0116519 A1* | 4/2022 | Nikhara | ................. | H04N 23/74 |

* cited by examiner

*1400*

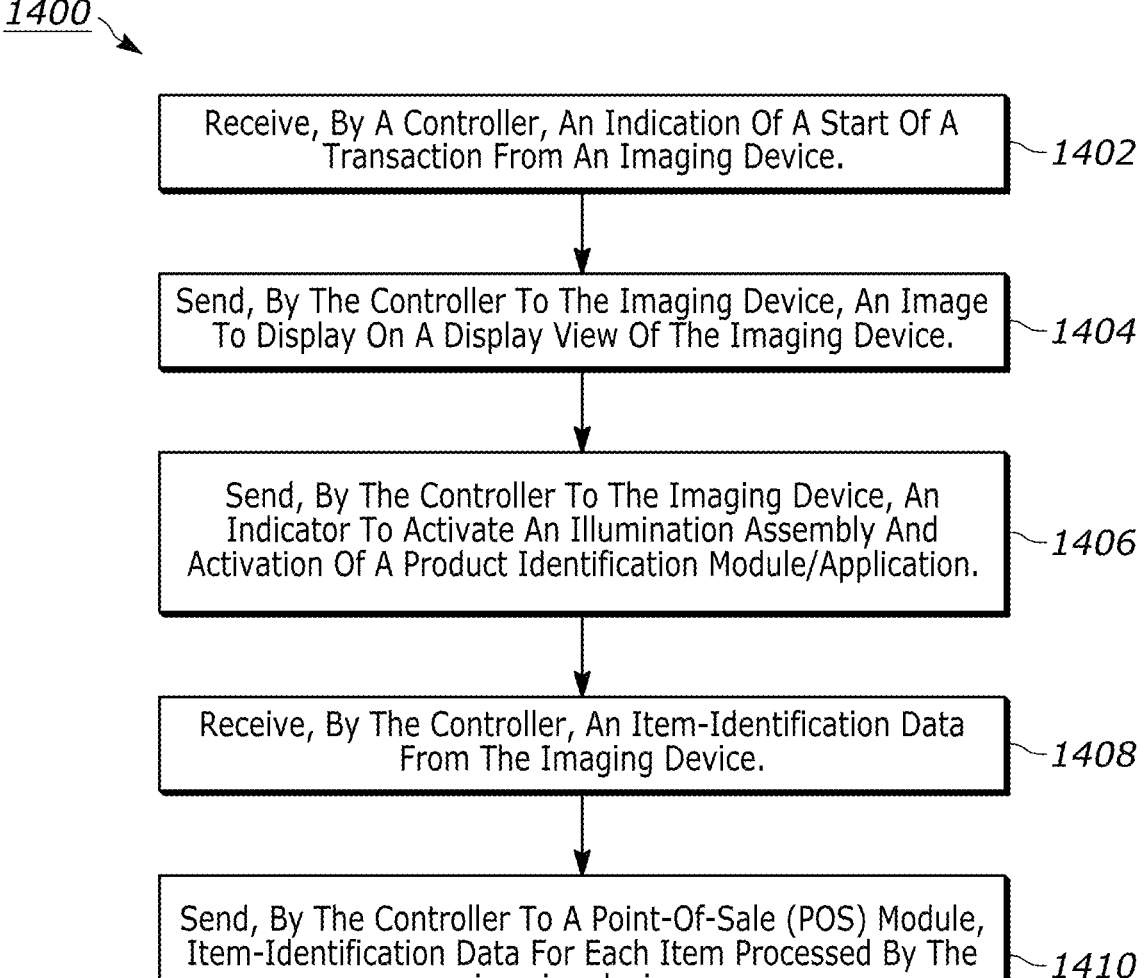

Receive, By A Controller, An Indication Of A Start Of A Transaction From An Imaging Device. ~*1402*

Send, By The Controller To The Imaging Device, An Image To Display On A Display View Of The Imaging Device. ~*1404*

Send, By The Controller To The Imaging Device, An Indicator To Activate An Illumination Assembly And Activation Of A Product Identification Module/Application. ~*1406*

Receive, By The Controller, An Item-Identification Data From The Imaging Device. ~*1408*

Send, By The Controller To A Point-Of-Sale (POS) Module, Item-Identification Data For Each Item Processed By The imaging device. ~*1410*

FIG. 12

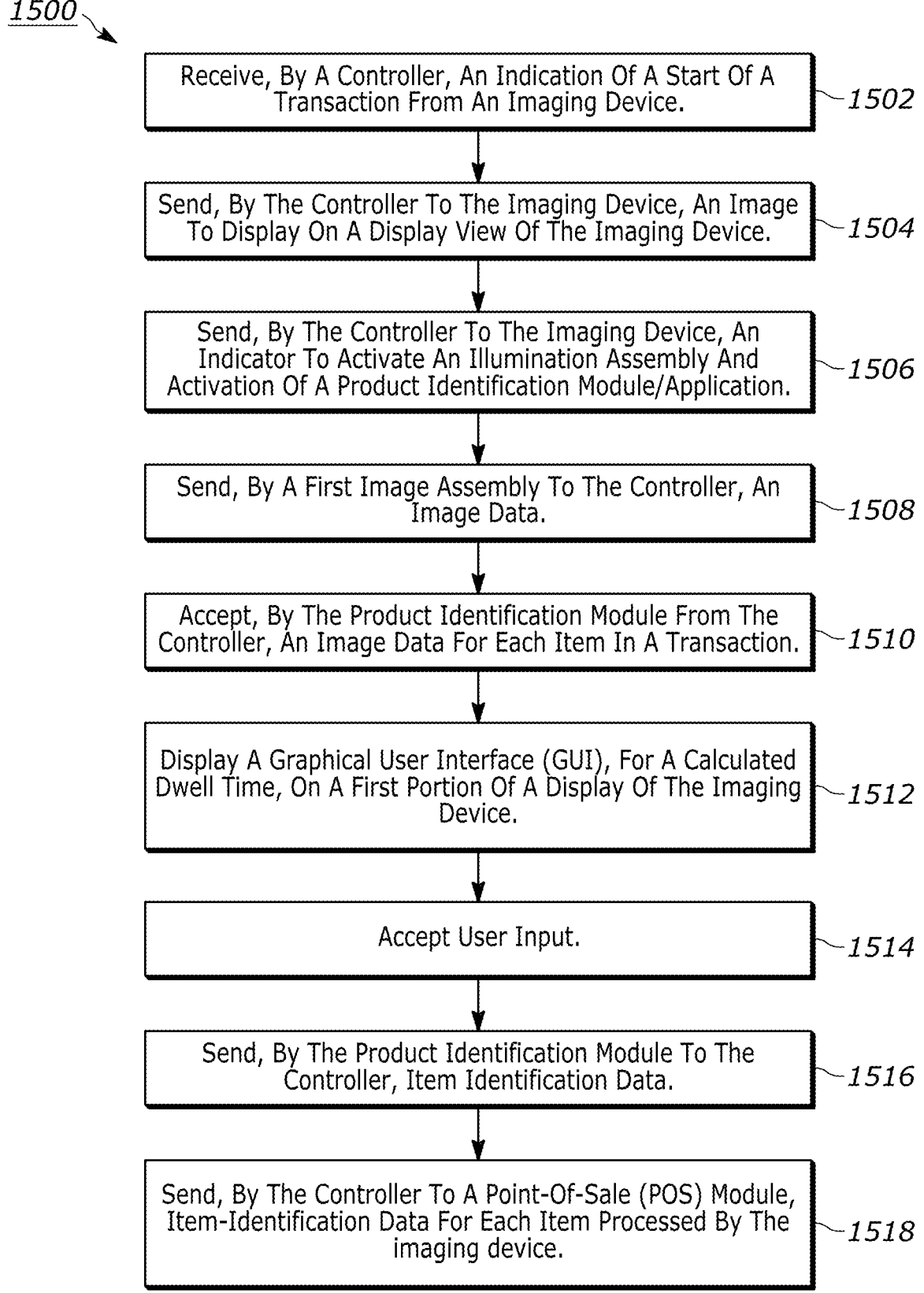

1500

Receive, By A Controller, An Indication Of A Start Of A Transaction From An Imaging Device. —1502

Send, By The Controller To The Imaging Device, An Image To Display On A Display View Of The Imaging Device. —1504

Send, By The Controller To The Imaging Device, An Indicator To Activate An Illumination Assembly And Activation Of A Product Identification Module/Application. —1506

Send, By A First Image Assembly To The Controller, An Image Data. —1508

Accept, By The Product Identification Module From The Controller, An Image Data For Each Item In A Transaction. —1510

Display A Graphical User Interface (GUI), For A Calculated Dwell Time, On A First Portion Of A Display Of The Imaging Device. —1512

Accept User Input. —1514

Send, By The Product Identification Module To The Controller, Item Identification Data. —1516

Send, By The Controller To A Point-Of-Sale (POS) Module, Item-Identification Data For Each Item Processed By The imaging device. —1518

FIG. 13

SCANNER WINDOW WITH DISPLAY

BACKGROUND

Self-checkout at retail stores can be cumbersome for users and a potential area for loss for store owners. Users are accustomed to scanning products using a barcode reader, such as a handheld reader or bioptic reader. The barcode readers communicate scanned data to a separate, co-positioned computing station that displays product information associated with the barcodes, as well transaction data, etc. Despite advances in barcode readers, there is limited space on them to provide any of this information to the user. Users must rely on the computing station for information display. Not only are barcode readers relatively small in size making it cumbersome to attach a sizeable external to display on them, barcode readers such as bioptic readers are designed with fairly complex optical components that seek to maximize the size, angle, and positioning of imaging fields of views (FOVs). Designers know that carefully designed FOVs will allow barcode readers to more quickly scan a product. Yet, at the same time, these FOVs further limit the real estate available on a barcode reader for attempting to display information.

There is a need for barcode readers, and other imaging devices, that are able to integrate a display with a scanner window fully functional to scan products over a FOV, while the display does not hinder such scan operation.

SUMMARY

In an embodiment, the present invention provides an imaging device that includes a housing, an imaging assembly, and a display assembly. The housing has an exit window. The imaging assembly has a first imaging sensor, the imaging assembly having a first field of view (FOV) directed through the exit window. The display assembly is positioned to generate a display view through the exit window and positioned such that the display view is positioned to consume a first portion of the exit window that at least partially overlaps with a second portion of the exit window consumed by the first FOV.

In some embodiments, the display assembly is configured to display a graphical user interface (GUI) to a user within the display view of the display assembly, in which the GUI includes information pertaining to any of: a product, at least one produce item, a purchase transaction, a product scan, debug status, a product weight determination, and machine vision application, in which the display assembly is further configured to accept a user input. In some such embodiments, the display assembly is configured to intermittently present the graphical user interface (GUI) to the user. Alternative, or additionally, in some embodiments, the imaging device the display assembly is configured to alternate between a first state and a second state, wherein: the first state includes presenting the GUI; the second state includes not presents GUI; and the display assembly is configured to capture image data over the second portion of the exit window during the second state. In some embodiments, the housing has (i) a lower housing portion with an upper surface facing a product scanning region, a substantially horizontal window, and a weigh platter, and (ii) an upper housing portion that extends above the lower housing portion with the exit window, in which the exit window is a substantially upright window, and in which the imaging device is configured to alternate between the first state and the second state based on a positive dwell time signal from a weigh platter. In some embodiments, the display assembly is configured such that the display view is at least partially transparent during the second state.

In some embodiments, the imaging device includes a touchscreen configured to accept user input from a GUI presented in the first portion. The display assembly is configured to alternately display information to a user in the first portion of the exit window, in which the imaging assembly is configured to capture item-identification data through the second portion of the exit window and/or provide illumination to the first FOV through the first portion of the exit window in some embodiments. In some embodiments, the display assembly is further configured to intermittently accept input from a user via a graphical user interface presented in the first portion of the exit window. An illumination assembly is configured to provide illumination over the FOV in some embodiments.

In some embodiments of the imaging device, the exit window of the display assembly includes any of: a capacitive touchscreen, an array of transparent touch sensors, a grid of printed nanowires on a transparent sheet, frosted elements applied to the exit window, and markings applied on a bezel at edges of the exit window. In some embodiments, the display assembly is adjacent to the exit window. The display assembly is a backlit display assembly, edge lit display assembly, or projection-based display assembly, in some embodiments of the imaging device. In some embodiments, the display assembly of the imaging device is switchable between translucent, opaque, semi-transparent, and/or transparent modes. In some embodiments, the display assembly is controllable to interleave a display within the display view with (i) exposure of sensors of the imaging assembly and/or (ii) illumination from an illumination assembly of the imaging device. The imaging device is a slot scanner, kiosk scanner, or bioptic scanner in some embodiments. In some embodiments, the housing has (i) a lower housing portion with an upper surface facing a product scanning region and a substantially horizontal window and (ii) an upper housing portion extending above the lower housing portion with the exit window, wherein the exit window is a substantially upright window. A focal point of the first imaging sensor is a predetermined distance away from the exit window into a the first FOV so that a view displayed on the exit window is perceived by the first imaging sensor as being blurry in some embodiments of the imaging device.

In an embodiment, the present invention provides a system for identifying an image during a transaction. The system includes an imaging device, an illumination assembly, and a controller. The imaging device includes a housing, an imaging assembly, and a display assembly. The housing has (i) a lower housing portion with an upper surface facing a product scanning region 180 and a substantially horizontal window and (ii) an upper housing portion extending above the lower housing portion with a substantially upright window. The imaging assembly has a first imaging sensor, and the imaging assembly has a first field of view (FOV) directed through at the substantially upright window. The controller is configured to coordinate activation of the imaging device and the illumination assembly, the controller including a product identification module.

In some embodiments of the system, the controller includes one or more processors and a memory storing instructions that, when executed by the one or more processors cause the one or more processors to: receive, from the imaging device, an indication of a start of a transaction; receive, from the imaging device, an item-identification data; send, to the display assembly, an image to display on the display view; send, to the imaging device, an indicator to activate the illumination assembly before activating the product identification module; and send, to a point-of-sale (POS) module, item-identification data for each item processed by the imaging device. In some such embodiments, the product identification module is configured to receive item-identification data from the imaging device. The first image assembly is configured to send image data to the controller in some implementations, and in which the product identification module is configured to accept image data corresponding to a transaction, and the product identification module is configured to send item-identification data to a point-of-sale (POS) module for each item in a transaction. In some implementations, the memory further includes instructions that cause the one or more processors to send, via a communications module, item-identification data to a machine learning module, wherein the machine learning module is configured to accept training data, in which the training data includes manual identification of images captured by the product identification module. The machine learning module is located outside of the imaging device, and includes at least one of a remote server and a cloud-based server in some system embodiments.

In some embodiments of the system, the product identification module comprises a graphical user interface (GUI) displayed on the first portion of the upright display, the GUI including customer input icons located in an area outside of the first FOV. In some such embodiments, the memory further includes one or more instructions that cause the one or more processors to: calculate a dwell time for displaying the GUI; calculate a wait time during which the product identification module will accept a customer input; and display the GUI for the calculated dwell time and accept user input during the wait time. The dwell time is calculated based on a trigger, the trigger comprising any of: a transaction start signal from the imaging device; and an identification of an item without an indicia, the identification made by the product identification module, in some embodiments.

Alternatively, or additionally, in some embodiments, the controller is configured to determine timing for alternating between activation of the display, activation of the illumination assembly, and acceptance of item-identification data from the imaging device such that first portion of the upright display does not occlude the first FOV during reading of an indicia by the imaging device. The illumination assembly includes one or more light sources configured to be selectively activated by the controller in some embodiments of the system.

In an embodiment, a method of identifying a product during a transaction using a scanning system is provided. The scanning system has an imaging device, an illumination assembly, and a controller. The method includes receiving, by the controller, an indication of a start of a transaction from the imaging device; receiving, by the controller, an item-identification data from the imaging device; sending, by the controller to the imaging device, an image to display on a display view of the imaging device; sending, by the controller to the imaging device, an indicator to activate the illumination assembly before activating a product identification module; and sending, by the controller to a point-of-sale (POS) module, item-identification data for each item processed by the imaging device.

In some embodiments, the method also includes receiving, by the product identification module, item-identification data from the imaging device. The method also includes, in some embodiments, the imaging device having: a housing having (i) a lower housing portion with an upper surface facing a product scanning region 180 and a substantially horizontal window and (ii) an upper housing portion extending above the lower housing portion with a substantially upright window; an imaging assembly having a first imaging sensor, the imaging assembly having a first field of view (FOV) directed through at the substantially upright window; and a display assembly having the display view, the display view being through at least the substantially upright window and positioned such that the display view is positioned to consume a first portion of the substantially upright window that at least partially overlaps with a second portion of the substantially upright window consumed by the first FOV, in which the method further includes: sending, by the first image assembly, image data to the controller; accepting, by the product identification module, image data from the controller for each item in a transaction; and sending, by the product identification module, item-identification data to the controller. The method includes sending, by the product identification module item-identification data directly to the POS module, wherein the controller comprises memory including the product identification module in some embodiments. Some such embodiments of the method include, sending, by a communications module, item-identification data to a machine learning module. The method includes sending, by a communications module, item-identification data to a machine learning module in some embodiments. In some embodiments, the methods includes training the machine learning module with training data comprising manual identification of images captured by the product identification module. In some embodiments of the method, the machine learning module is located outside of the scanning system, the machine learning module also includes at least one of a remote server and a cloud-based server. In some embodiments, the method also includes calculating, by the controller, a dwell time for displaying a graphical user interface (GUI) on the first portion of the upright display, the product identification module comprising the GUI; calculating, by the controller, a wait time during which the product identification module will accept a customer input; displaying the GUI for the calculated dwell time; and accepting user input during the wait time. In some embodiments, the method involves calculating the dwell time based on a trigger, the trigger comprising any of: a transaction start signal from the imaging device; and an identification of an item without an indicia, the identification made by the product identification module. The method also includes determining, by the controller, timing for alternating between: activation of the display, activation of the illumination assembly, and acceptance of item-identification data from the imaging device, such that the first portion of the upright display does not occlude the first FOV during reading of an indicia by the imaging device, in some implementations.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 12 and FIG. 13 illustrate block diagrams of example processes as may be implemented by the system of FIG. 1, for implementing example methods and/or operations described herein.

Figure 1:
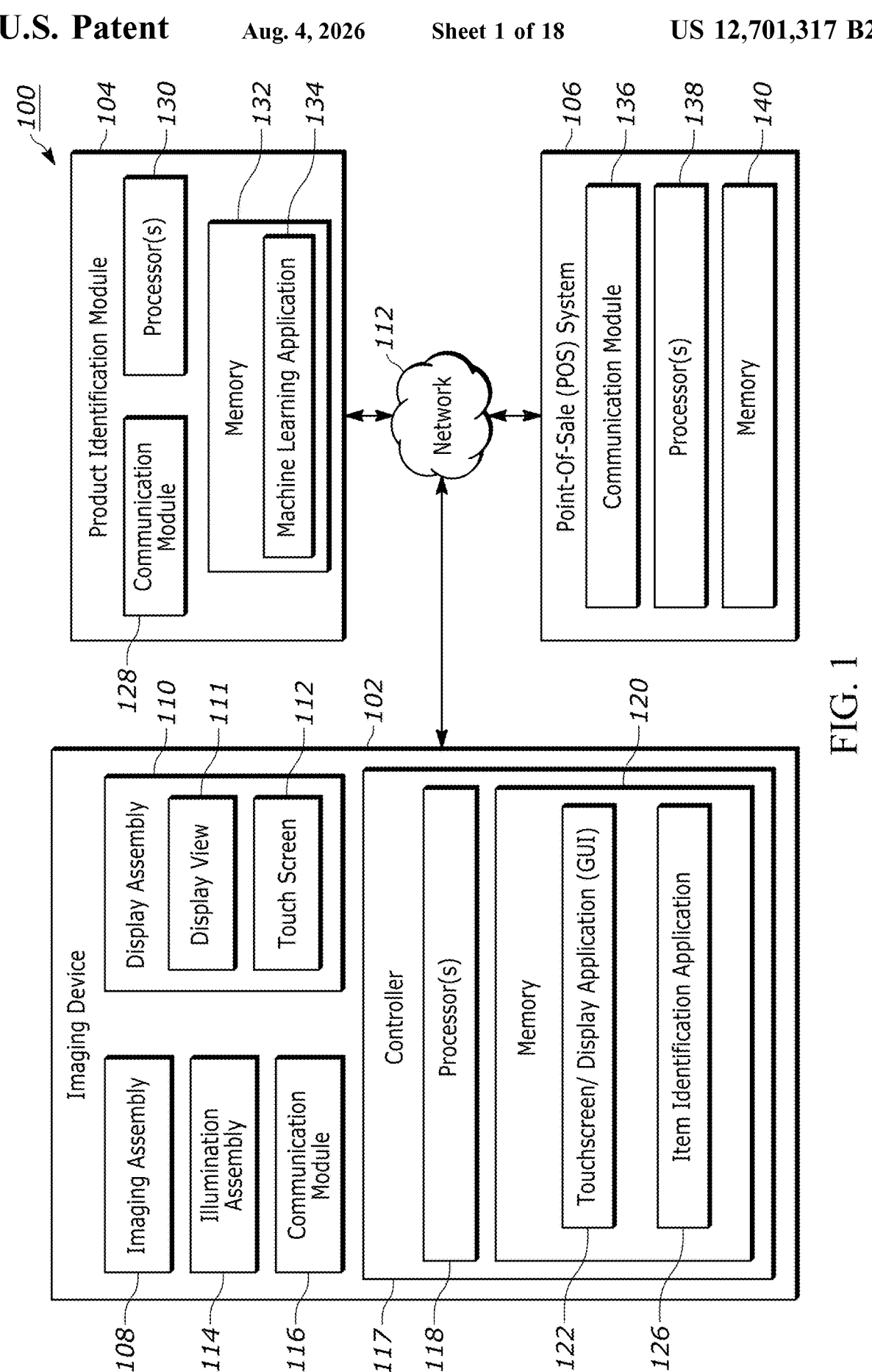
FIG. 1 illustrates a block diagram of an example system for implementing example methods and/or operations described herein including techniques for displaying information to a user on an imaging device having a scanner window with integrated display, in accordance with an example.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Self-checkout stations often include an imaging device in the form of a barcode reader and point-of-sale (POS) system with a display, and sometimes with a separate dedicated pay terminal. Items are scanned with the barcode reader that reads barcodes associated with items. The resulting item information associated with those barcodes is generated by and displayed on the POS system. The user is then able to interact with that POS system to confirm item information and complete a transaction, for example, by interacting with the integrated display interface.

While such self-checkout stations are common, they are fairly large taking up a considerable amount of store real estate. Also, the customer interface can be somewhat confusing, with the display interface often positioned far above the barcode reader. These limitations result, at least in part, because the barcode reader and the POS system are two entirely separate systems, that only communicate with each other through a communication link or network. There are, of course, numerous legacy reasons why these systems are separate. Principally, however, conventional barcode readers have limited real estate that does not allow for suitably displaying item information to a customer.

To overcome these and other deficiencies in current imaging devices and POS systems, the techniques herein include imaging devices that integrate a scanner window with a display view. In various examples, imaging devices are able to scan items through a scanner window, as normal, but where that scanner window also provides a display upon which information on scanned items may now be displayed. The result is that the imaging device itself can integrate the display functional conventionally associated with the POS system, or any other separate dedicated computing system. Further, in various examples, the scanner windows of the imaging devices provides not only a display but a user interface, such that a user can interact with the displayed item information, for example, through touch interaction.

In various examples, after scanning a barcode, an imaging device provides a display view in the same scanner window through which the barcode was scanned. That display view may include information on the item that is associated with the scanned barcode. A user can review the displayed information (e.g., a text description or image of the item associated with the barcode), and then confirm, at the imaging device, whether that information is correct or incorrect. For example, the display view may include a graphical user interface (GUI).

With the present techniques, imaging devices may now integrate scanning operations with information display functionality and user interaction to allow for heretofore unrealized uses of imaging devices. For example, a user may not be able to complete an entire self-checkout operation through interacting only with the imaging device. Further, while examples are described in which the imaging device scans a barcode and displays barcode derived information, other types of scanning operations may be used, such an object imaging, and any suitable information may be displayed on the scanner window. Such variations expand considerably the use cases of imaging devices. Imaging devices may now be used for robust and fast objecting imaging (i.e., capturing two-dimensional images of an item and doing object recognition), where a user can confirm at the imaging device whether the correct item was identified. Imaging devices may now be used to train a product identification module, where a user can both image an item and input information on that item using the imaging device, without having to resort to using a separate dedicated computing system to input information.

Referring now to FIG. 1 which illustrates an example computing system 100, e.g., a point-of-sale (POS) system, for implementing the techniques herein. The system 100 includes an imaging device 102 that, as described further below, may include an internal display the generates a display view that occupies at least a portion of a scanner window. In addition to the imaging device 102, the computing system 100 includes two additional computing devices: a product identification module 104 and a point-of-sale system (POS) 106. Also included, a network 107 facilitates data exchange between the imaging device 102, the product identification module 104, and the POS system 106.

The imaging device 102 may include an imaging assembly 108 configured to capture images of items, barcodes, QR codes, etc., a display assembly 110, an illumination assembly 114 with one or more light sources, a communication module 116, and a controller 117. All of these may be physically integrated into a housing of the imaging device 102. The imaging device 102 may also be referred to as a barcode reader or scanner.

As discussed in various examples herein, the display assembly 110 in the imaging device 102 is positioned to generate a display view 111 through an exit window (also termed a scanner window) of the imaging device 102. For example, as discussed in various examples herein, the imaging device 102 may have a housing with an exit window. The various imaging assemblies described and illustrated herein may include a color camera, a black and white camera, an image sensor, a proximity sensor, a machine vision imaging assembly, a bioptic vision array, and a barcode imaging assembly. The imaging assembly 108 may have an imager (also termed herein an imaging sensor) that has an imaging FOV directed through that exit window. The display assembly 119 may be positioned to generate the display view 11 through that exit window and may further be positioned such that the display view 111 consumes only a portion of the exit window. In various examples, the display view 111 only partially overlaps with that imaging FOV at the exit window. While in some examples, the display view 111 fully overlaps with the imaging FOV at the exit window or does not overlap at all with the imaging FOV, depending on the size of the exit window and the size of the imaging FOV.

Through the display view 111, the imaging device 102 may display a graphical user interface (GUI) that includes information pertaining to any of: a product, at least one produce item, a purchase transaction, a product scan, a debug status, a product weight determination, and an interface of an executing application such as a machine vision application.

In addition to displaying information through an exit window of the imaging device 102, the display assembly 110 may also include a touchscreen 112 that allows users to interact with that information. For example, the display view 111 may present information using a GUI visible at the exit window, and the touchscreen 112, also positioned at the exit window, allows the user to interact with that GUI. Various examples of imaging devices with integrated display assemblies generating display views through exit windows are provided FIGS. 2-6 described below.

As shown in FIG. 1, the imaging device 102 may also include an illumination assembly 114 configured to provide illumination over an illumination FOV.

A communication module 116 may allow data (e.g., commands, or other information) to be passed between the imaging device 102 and on-board components and/or applications, as well as and any of the production identification module 104 and the POS system 106. In some examples, the communication module 116 of the imaging device 102 may connect to a network 112 that facilitates this communication of data.

A controller 117 of the computing device 102 may include one or more processors 118 and a memory 120 with any of: a touchscreen display application 122, an item identification application 126, and other applications for capturing, processing, and presenting information via the imaging device. The processors 118 may interact with the memory 120 to obtain, for example, machine-readable instructions stored in the memory 120 corresponding to, for example, the operations represented by the flowcharts of this disclosure, including those of FIG. 12 and FIG. 13. In particular, the instructions stored in the memory 120, when executed by the processors 118, may cause the processor 118 to receive and analyze signals generated by the imaging assembly 108, user input via a GUI presented by the display assembly 110, and the communication module 116.

In various examples, the touchscreen display application 122 includes a component interleaving application that coordinates operations of the various assemblies of the imaging device 102, including the imaging assembly 108, the illumination assembly 114, the display assembly 110, and the communication module 116. The touchscreen display application 122 provides the images and GUIs that are presented to the user by the display assembly 110 in the display view 111.

Items being purchased during a transaction, particularly items that do not have barcodes, may be identified by executing instructions associated with the item identification application 126. In some examples, executing the item identification application 126 may include receiving item-identifying information from a user, e.g., via the display view 111 presented at the exit window of the display assembly 110. For instance, a user may make a selection via the GUI in the display view 111 to identify the item specifically, or to identify a category or sub-category of the item. Additionally or alternatively, in some examples, executing the item identification application 126 may include causing the imaging assembly 108 (e.g., via the controller 117, including the touchscreen display application) to capture an image of an item (e.g., an item in a product scanning region 180 associated with a POS), or otherwise receiving or obtaining a captured image of the item from the imaging assembly 108 or from another device in communication with the imaging assembly 108. The item identification application 126 may use image analysis techniques to analyze the captured image of the item to identify the item specifically, or to identify a category or subcategory of item. In some examples, the item identification application 126 may determine that the captured image of the item corresponds to a particular category of item, but cannot determine which of a plurality of sub-categories of the category of item appear in the captured image.

Alternately, or additionally, the item identification application 126 may be used to preprocess information obtained by the imaging device 102. The identification application 126 may be used to decode barcode or QR code information, and this information may be passed to the POS system 106. Images obtained by the imaging assembly 108 of produce or items without indicia (e.g., barcodes, QR codes) or with unreadable indicia may be preprocessed using the item identification application 126 to possibly downsize the images or apply certain filters before passing the image data to the product identification module 104. Further, the item identification module 126 may send information to the product identification module 104 to aid in any machine learning or artificial intelligence (AI) training done in connection with the product identification module 104.

The product identification module 104 may be a computing device having a communication module 128, processor(s) 130, and a memory 132 storing at least instructions which, when executed by the processor(s) 130, identify items using the information received by the product identification module 104. The memory 132 may include a machine learning module or application 134 that accepts data from the imaging device 102, including image data captured over the imaging FOV extending through the exit window of the imaging device 102, as well as user input data captured by the touchscreen 112 in response to the display view 111 presented at an exit window. For example, the machine learning application 134 may accept training data or updated information, including image data and user input data (e.g., manual identification of captured images), to train the product identification module 104 to more accurately identify items while minimizing user input. The productive identification module 104 may be located outside of the imaging device 102 on a remote server and/or a cloud-based server and communicatively coupled to the imaging device. In other examples, all or part of the machine learning application 134 may be located in the imaging device 102, e.g., in the memory 120, to allow the imaging device 102 to provide a machine learning trained application for product identification.

The POS system 106 may by a computing device that includes a communication module 136, process(s) 138, and memory 140. The memory 140 may store instructions, which when executed by the processor(s) 138, cause the POS system 106 to process an item as part of a transaction, as well as to accept user input to begin or end a transaction.

Figure 2A:
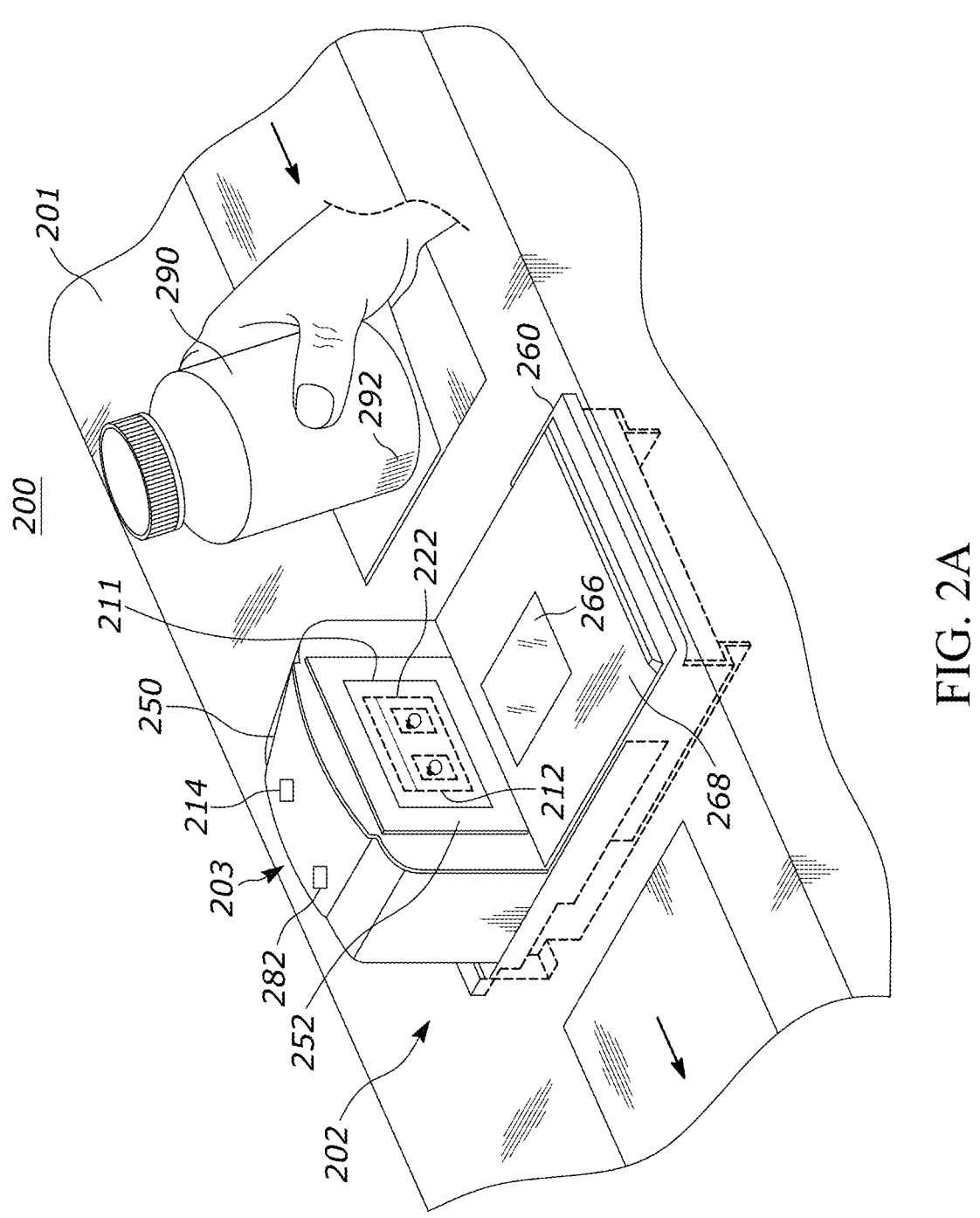
FIGS. 2A and 2B illustrate a scanning station having an imaging device having a scanner window with integrated display as may be used in the system of FIG. 1, in accordance with an example.
Figure 2B:
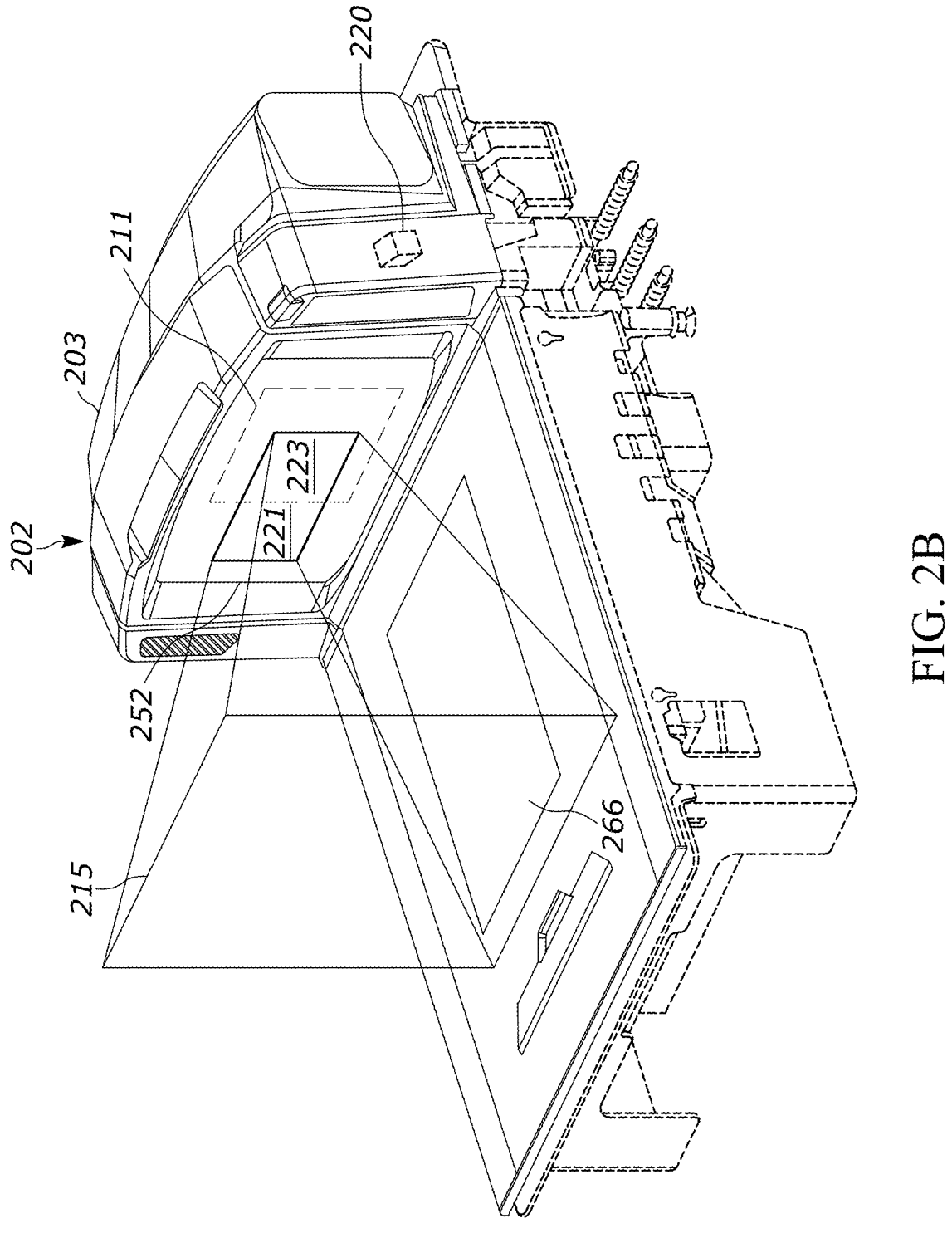

In FIGS. 2A and 2B, a scanning station 200 as may appear within a retail environment is shown. The scanning station 200 includes a workstation 201 for supporting an imaging device 202, in the form of a bioptic barcode reader. The imaging device 202 has a housing 203 that is defined by having a lower portion 260 supported within the workstation 201 and a raised portion 250 extending above the lower portion 260 and above an upper surface of the workstation 201. The lower portion 260 may include an upper surface facing a product scanning region 180 and a weigh platter 268 operable to weigh items placed thereon. In FIG. 2A, an item 290 to be identified (e.g., a bottled or boxed product) is shown approaching the scanning station 200, and having an indicia 292 oriented toward the imaging device 202.

In the illustrated example, the imaging device 202 includes two exit windows 252, 266 (also termed scanner windows) one for each portion 250, 260, respectively. The exit window 252 is substantially vertical, while the exit window 266 is substantially horizontal. Different imaging FOVs extend through the exit windows 252, 266 allowing one or more internal imaging assemblies to capture images (also referred to as image data) associated with items presented to the imaging device 202.

Advantageously, the imaging device 202 further includes components for displaying information at one or more of the exit windows 252, 266, information such as images, item identification data, etc. For example, in the illustrated example, a display view 211 is visible at the exit window 252 and includes a GUI 222 including graphics. The display view 211 has been generated by a display assembly within the housing 203.

As shown in FIG. 2B, an imaging FOV 215 is incident upon and extending through the exit window 255 over a first portion of that exit window 255. The imaging FOV 215 corresponds to an imaging assembly 220 within the housing 203 and impinges on the exit window 255 over a first portion 221 thereof. Meanwhile, the display view 211 also impinges on the exit window 255 but over a second portion 223 that at least partially overlaps with the first portion 221. The exit window 252 can be considered to have a finite area, with the display view 211 occupying the portion 223 of the finite area of the exit window 252 and the imaging FOV 215 occupying the portion 221 of that finite area. Overlap refers to occupying the same physical location of the exit window 255 when active. It will be appreciated from further discussions herein that the imaging FOV 215 may be controlled such that it is not active at the same time the display view 211 is active and visible. For example, as discussed further herein, a controller of the imaging device 202 may cycle a display assembly (not shown) between a first state in which the display assembly is turned on and presents a display view, for example, having a GUI, and a second state in which the display assembly is turned off or otherwise does not transmit a display view. When the display assembly is in the second state, the imaging assembly may be activated to capture image data through the exit window 255. In various examples, switching between the states of the display assembly may be achieved responsive to triggering events detected at the imaging assembly 202, such as switching from the first state to the second state based on a positive dwell time signal from a weight platter.

Information or a GUI 222 may be displayed to a user within the display view 211 of the display assembly 110. The portion of the exit window 252 occupied by the display view 211 may include a touchscreen 212 area. The display view 211 occupies an area that, in part, may include a touchscreen 212 that is part of the exit window 252. The information or GUI 222 is displayed at least in part over the touchscreen 212. This positioning allows for user input to be registered as a user (e.g., a customer) interacts with the GUI 222 during a transaction.

The touchscreen may include any of: a capacitive touchscreen, an array of transparent touch sensors, a grid of printed nanowires on a transparent sheet, frosted elements applied to the exit window 252, markings applied on the bezel at the edges of the exit window 252, and any suitable technology capable of providing at least some visual transparency while capturing touch events in a specific area. At least partial transparency for the touchscreen material may be useful when displaying the GUI through an area of the touchscreen. Further, in the absence of interface areas on the touchscreen, physical buttons may accept user input when a user interacts with a GUI.

Figure 3:
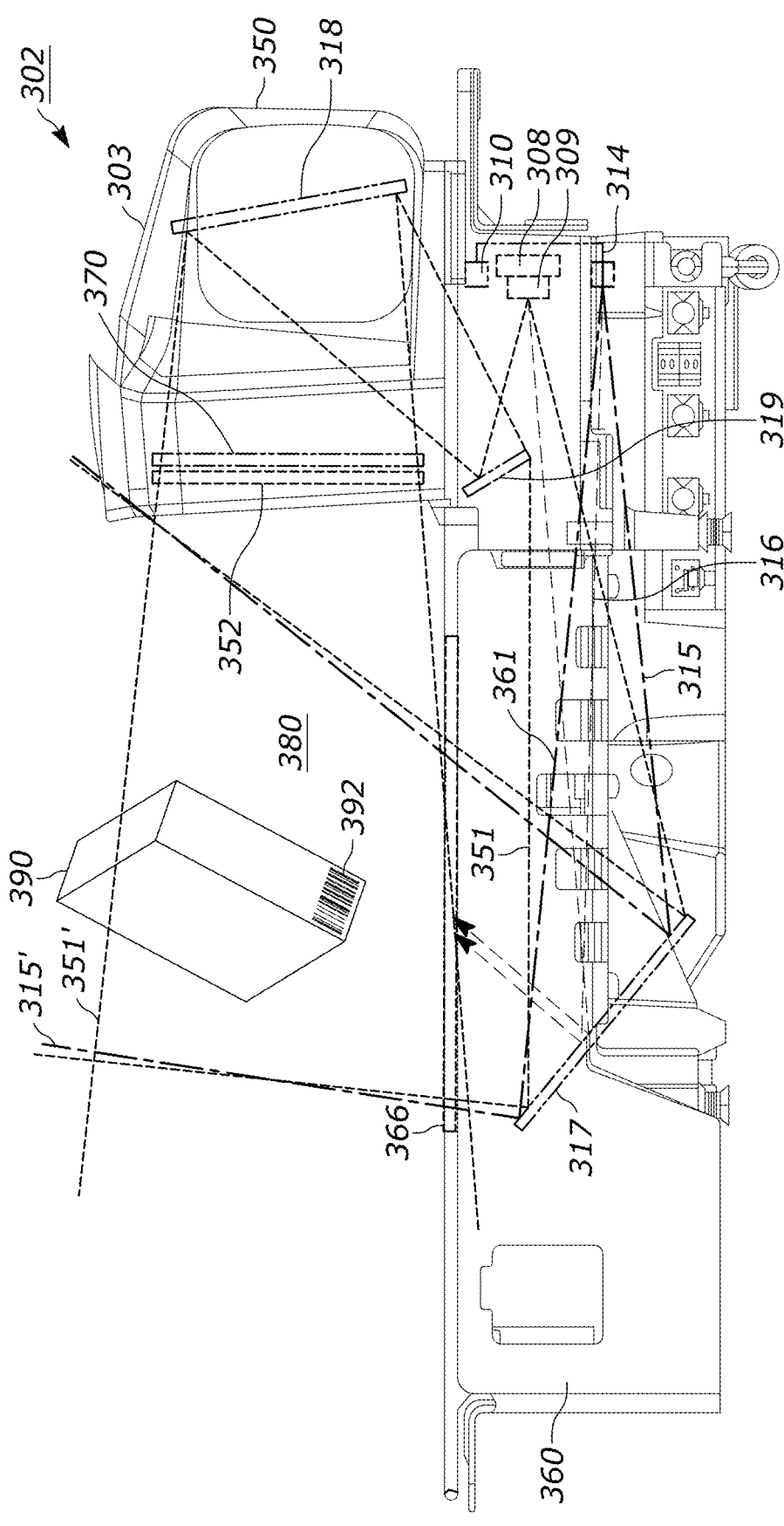
FIG. 3 illustrates a cross-section view of an example imaging device, in accordance with an example.

FIG. 3 illustrates an imaging device 302 showing an example implementation of a bioptic reader that integrates a scanner window with a display view generated by a display assembly. The imaging device 302 includes an imaging assembly 308 and an illumination assembly 314, both positioned within housing 303. The imaging assembly 314 is recessed within a lower housing portion 360 such that an internal path length 361 extends between a front of the imaging assembly 308 and a horizontal window 366 such that an imaging FOV 351 is directed out of horizontal window 366 and, preferably, fills most of horizontal window 366. As used herein, the front of imaging assembly 308 could be the front surface of an imager, the front surface of a lens, the front surface of a baffle, the front surface of a lens holder, etc., depending on the structure of the particular imaging assembly used.

Imaging assembly 308 includes an imager 309, such as a CMOS digital image sensor, that can be configured to capture an image of an object, such as a product 390 being purchased, that is positioned within a product scanning region 380.

Illumination assembly 314 is also positioned within housing 303 recessed within lower housing portion 360 such that an internal path length 316 extends between a front of the illumination assembly 314 and the horizontal window 366 such that an illumination FOV 315 is directed out of the horizontal window 366.

In the example of FIG. 3, the imaging device 302 includes a first mirror 317, a second mirror 318, and a splitter mirror 319 that redirects a portion of imaging FOV 351 of imaging assembly towards second mirror 318. Splitter mirror 319 is positioned within housing 303 and is positioned and oriented to redirect a portion of imaging FOV 351 toward second mirror 318, which is positioned in upper housing portion 350 of housing 303 and redirects the portion of imaging FOV 351 redirected by splitter mirror 319 toward upright exit window 352. The result is an imaging FOV 351' that extends out generally horizontally.

The portion of imaging FOV 351 not redirected by splitter mirror 319 is directed towards first mirror 317, which is positioned within lower housing portion 360 of housing 303 and redirects the portion of imaging FOV 351 not redirected by splitter mirror 319 generally vertically out of horizontal exit window 366.

Illumination FOV 315 of illumination assembly 314 may also be directed towards the first mirror 317, which also redirects the illumination FOV 315 towards the horizontal window 366.

While shown with only one, in other examples, the imaging device 302 may have two imaging assemblies, or an imaging assembly with two imagers, where the entire FOV of one imaging assembly (imager) is directed toward first mirror 317 and the entire FOV of the other imaging assembly (imager) is directed toward splitter mirror 319. Similarly, splitter mirror could be removed and the other imaging assembly (imager) could be directed at second mirror 318. In yet another example, the imaging device 302 could have two imaging assemblies, or an imaging assembly with two imagers, with one imaging assembly (imager) directed directly at horizontal exit window 366 and the other imaging assembly (imager) directed directly at upright exit window 352, without any required mirrors.

The imaging device 302 further includes a display assembly 370 positioned to generate a display view visible through the exit window 352. In the illustrated example, the display assembly 370 is adjacent an inner surface of the exit window 352 and is generally vertical. The display assembly 370 may be any of a variety of types of displays that are preferably switchable between translucent, opaque, semi-transparent, and/or transparent display modes. For example, the display assembly 370 may be a capacitive touchscreen display, an array of transparent touch sensors forming a display, a grid of printed nanowires on a transparent sheet forming a display, or electrically controllable elements applied directly to the exit window 352. The display 370 may be a dedicated display adjacent to the exit window 352, whether spaced from the exit window 352 or abutted against, whether immediately adjacent to with an intervening structure therebetween.

The display assembly 370 may be a backlit display assembly, edge lit display assembly, or a projection-based display assembly. For any of these examples, in particular for the latter, the inner surface of the exit window 352 may be treated with patterns or the like to enhance visualization of the display view generated by the display assembly 370. While the display view is not shown, as with the imaging device 202, the display view generated by the display assembly 370 at least partially overlaps with the imaging FOV 351'.

As exemplified by a projection-based display assembly, in various examples, the display assembly is not adjacent to an exit window but rather is spaced far from the exit window. For example, it may be more desirable to use a smaller display assembly, for cost reasons or due to confined real estate within an imaging device. In such cases, a smaller display assembly can still generate a large display view, visible to a user, by spacing that smaller display assembly further inside the imaging device and using mirrors, lens, or other optical components to enlarge the projection of that display onto the exit window thereby creating a sufficiently large display view.

While the display assembly 370 is shown in the upper portion 350 and adjacent the exit window 352, in other examples, a display assembly may be positioned in the lower portion 360 and adjacent to (or spaced from) the exit window 366, with a similar relationship to the imaging FOV 315.

A controller 310, which can include a processor and a memory, is positioned within housing 303 and is in communication with imaging assembly 308, illumination assembly 314, and display assembly 370, via any appropriate means, such as a wired or wireless connection. Controller 310 is configured to receive a captured image from the imaging assembly 308 and to process the captured image and determine if an object is present in the captured image. If the controller 310 determines that the object is a product 390, the controller 310 can be configured to locate and decode a barcode 392 located on product 390.

As discussed in further examples herein, the controller 310 is further configured to coordinate operation of the display assembly 370 and the imaging assembly 308 (and optionally the illumination assembly 314) to allow for display of a display view of information at the exit window 352 without interfering with the capturing of image data over the imaging FOV that also occurs through that exit window.

Figure 4A:
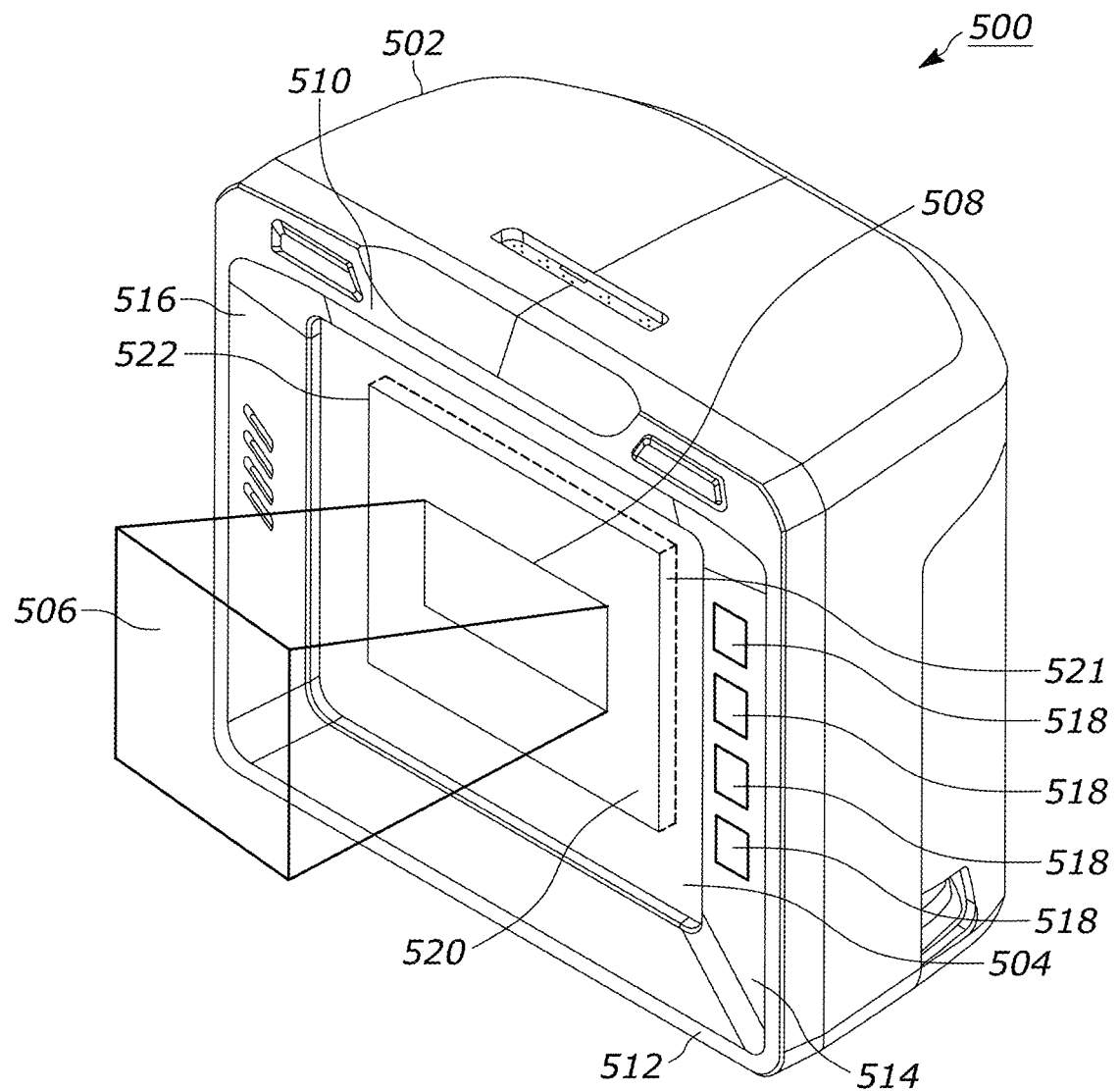
FIGS. 4A and 4B illustrate a perspective view and cross-section view, respectively, of another example imaging device, in accordance with an example.
Figure 4B:
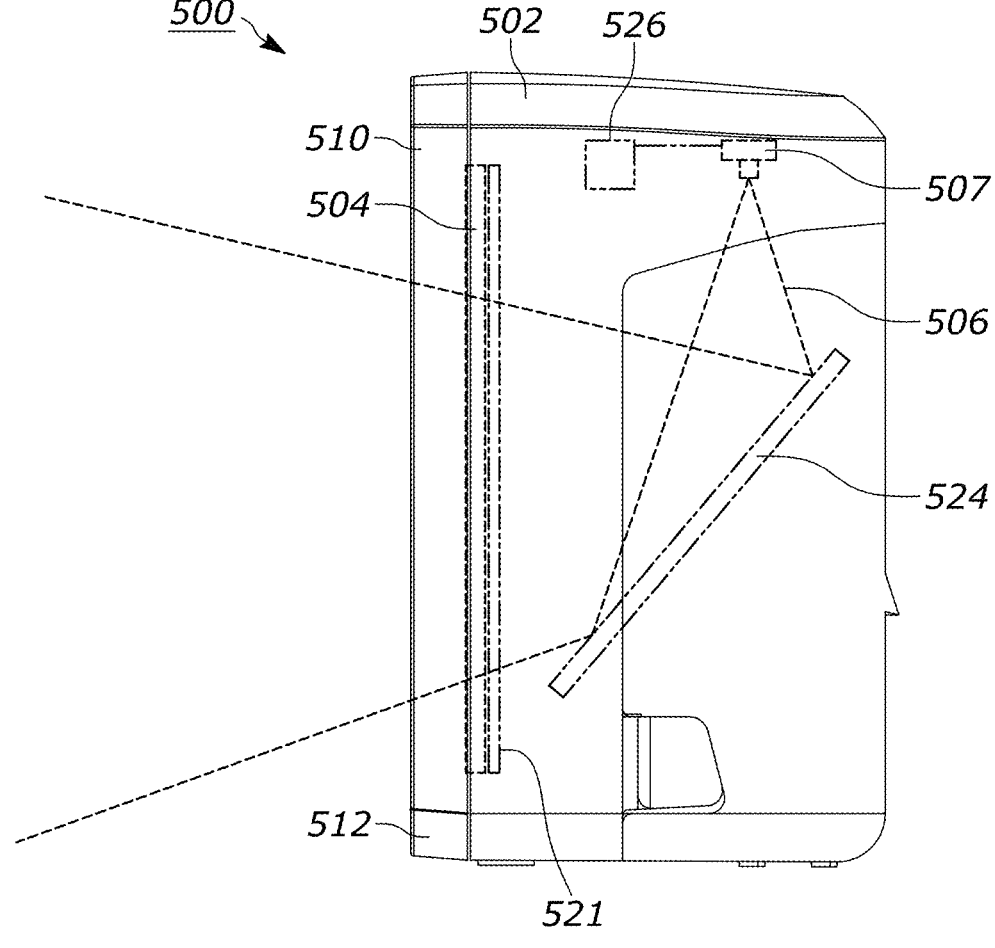

The present techniques may be implemented in imaging devices having various forms. FIGS. 4A and 4B, for example, illustrate an example imaging device 500, in the form of a mountable scanner. A housing 502 includes an exit window 504 through which an imaging FOV 506 of an imaging assembly 507 (FIG. 4B) extends, incident upon the exit window 504 over a first portion 508. The housing 502 is further defined by an upper portion 510, a lower portion 512, and vertical side portions 514/516, which collectively set a periphery around the exit window 504. The side portion 514 further includes physical buttons 518 (e.g., physical keys) that the user may interact with.

Visible at the exit window 504 is a display view 520 generated by a display assembly 521. That display view 520 is confined to a second portion 522 of the exit window 504 and, in the illustrated example, overlaps with the first portion 508.

As shown in the cross-section of FIG. 4B, the imaging assembly 507 may be mounted in the housing 502. For example, the imaging assembly 507 may be positioned in the upper portion 510 where the imaging FOV 506 is reflected from an internal mirror 524 through the exit window 504. The display assembly 521 is positioned adjacent to an inner surface of the exit window 504, such that the mirror 524 directs the imaging FOV 506 through the display assembly 521. A controller 526 is mounted in the upper portion 510 and communicatively coupled to both the imaging assembly 507 and the display assembly 521.

As with the other display assemblies herein, the display assembly 521 may be a capacitive touchscreen display, an array of transparent touch sensors forming a display, a grid of printed nanowires on a transparent sheet forming a display, or electrically controllable elements applied directly to the exit window 504. The display 521 may be a dedicated display adjacent to the exit window 504, whether spaced from the exit window 504 or abutted against, whether immediately adjacent to with an intervening structure therebetween. The display assembly 571 may be a backlit display assembly, edge lit display assembly, or a projection-based display assembly. For any of these examples, in particular for the latter, the inner surface of the exit window 504 may be treated with patterns or the like to enhance visualization of the display view generated by the display assembly 521.

In other examples, a projection display assembly may be used in the imaging device 500, instead of the display assembly 521. For example, a display assembly may be mounted in the lower portion 512 angled upward toward the exit window 504 and with a sufficiently large projecting angle (FOV) such that a display view is visible coinciding with the second portion the exit window 504. While the display view is not shown, as with the imaging device 202, the display view generated by the display assembly 370 at least partially overlaps with the imaging FOV 351'.

Figure 5:
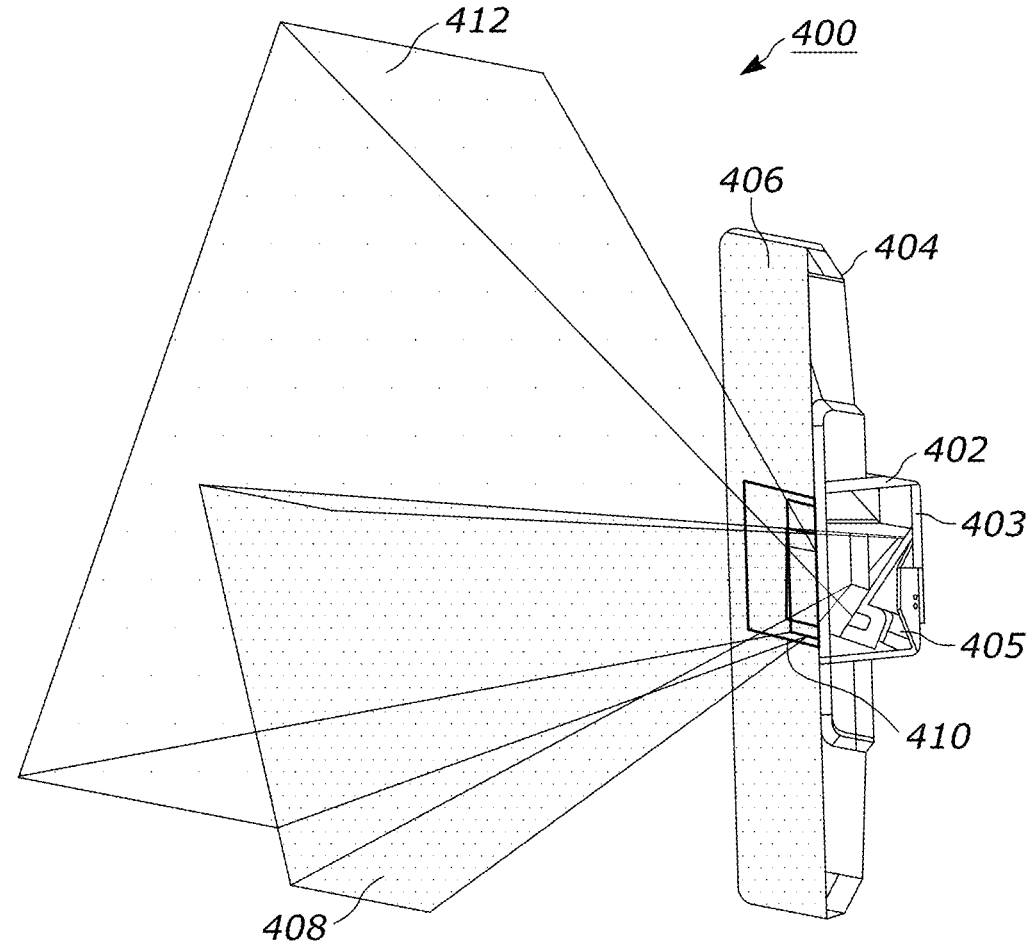
FIG. 5 illustrates yet another example imaging device that may be used in the system of FIG. 1, the imaging device being in the form of a wall-mounted user display assembly, in accordance with an example.
Figure 6:
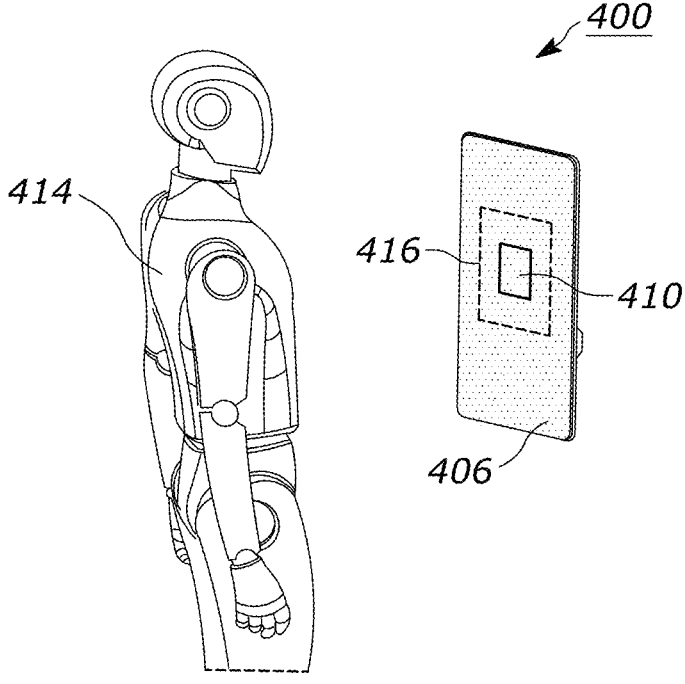
FIG. 6 and FIG. 7 illustrate the imaging device of FIG. 5 providing an interface display, in accordance with an example.
Figure 7:
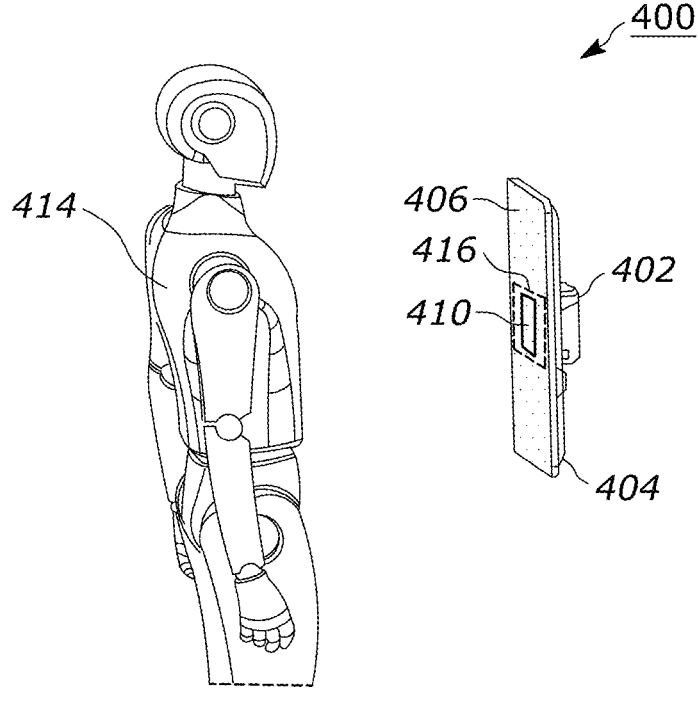

FIGS. 5, 6, and 7 illustrate an example kiosk station 400 having an imaging device in according the present teachings. In the illustrated example, an imaging device 402 is mounted into a housing 404 that includes an elongated display screen 406. The imaging device 402 may be, for example, implemented by the imaging device 500 of FIGS. 4A and 4B. That is, the imaging device 402 includes an imaging assembly 403 generating an imaging FOV 408 that extends through and outward from the display screen 406, and is used by the imaging assembly 403 to capture images. The imaging device 402 further includes a display assembly 405, mounted in a lower portion of the imaging device 402 and positioned to generate a display view 410 visible through the display screen 406, where that display view 410 is has a large FOV 412 that defines the angles over which the display view 410 is visible. In the illustrated example, the imaging FOV 408 overlaps within the FOV 412, but is confined to a narrow portion of that FOV. That relationship between the two FOV's allows for users of different heights and positions relative to the kiosk station 400 to be able to see the display view 410, but the imaging assembly 403 that scans for objects is limited to a narrow range.

In the illustrated example, the display screen 406 may be a touchscreen that allows a user 414 to interact with the display screen 406 for example in response to items in the display view 410. In various examples, the display screen 406 may be formed entirely of an array of transparent touch sensors or a grid of printed nanowires on a transparent sheet, for example. In various examples, only a portion 416 (see, e.g., FIGS. 6 and 7) of the display screen 406 may be formed of such features. That is, only the portion 416 of the display screen 406 may be a touchscreen.

Thus, as shown, while in various examples above, display assemblies are described as being touchscreens, as illustrated in the kiosk station 400, the touchscreen may be separate from the display assembly and indeed may be external to the imaging device altogether. In the illustrated example, the touchscreen is external to the exit window of the imaging device 402, and defines another exit window, where the display view 410 from the imaging device 402 nonetheless defines a portion of the exit window (i.e., display screen 406) that at least partially overlaps (in the illustrated example completely overlaps with the later), with a portion of the exit window (i.e., display screen 406) through which the imaging FOV 408 passes.

The imaging device 402 may be a slot scanner or a kiosk scanner. A slot scanner may be an imaging device that has a narrow opening through which an item is illuminated and imaged. A kiosk scanner may be an imaging device that has one window through which an item is illuminated and imaged and is attached to a fixed position or location.

By way of example, any of the imaging assemblies illustrated herein may be a color camera, a black and white camera, an image sensor, a proximity sensor, a machine vision imaging assembly, a bioptic vision array, and a barcode imaging assembly. Any of the imaging assemblies herein may use an imaging sensor that is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by a lens group over a respective imaging FOV along an imaging axis that is normal to the substantially flat image sensor. The lens group is operative for focusing the return light onto the array of image sensors (also referred to as pixels) to enable the image sensor, and thereby the imaging assembly, to form a digital image. In particular, the light that impinges on the pixels is sensed and the output of those pixels produce image data that is associated with the environment that appears within the FOV. This image data may be processed by an internal controller/processor (e.g., by being sent to a decoder which identifies and decodes decodable indicia captured in the image data). In reference to FIG. 1, image data may be sent upstream for processing by any of the controller 117, the product identification module 104 and the POS system 106. The decoded indicia and/or image data, or item-identification information, may be sent between the imaging device 102, the product identification module 104, and the POS system via the network 107.

The display assemblies in the various examples herein may be any of the following: a backlit display assembly, an edge lit display assembly, and a projection-based display assembly, for example. In various examples, the display assemblies may be configured to be switched between translucent, opaque, semi-transparent, and transparent modes. Alternatively, or additionally, the display assemblies may be switched between translucent and opaque modes or between transparent and opaque modes. Switching between modes may be controlled by a controller (such as controller 117 of FIG. 1), specifically by a component interleaving application. That is, as discussed in various methods herein, the controller 117 may interleave generated display views with capturing of image by the imaging assembly (e.g., exposure of the sensors) and/or with operation of illumination assembly.

Referring back to FIG. 1, in operation, the imaging device 102 alternates between illuminating a field of view in a scanning region (380 in FIG. 3), acquiring a product image or data from reading an indicia, presenting a view via the display assembly, and accepting user input via a GUI. Coordination of these actions may be accomplished by executing the component interleaving application of the controller 117.

The GUI 122 is generated by the imaging device 102 to display images, information, and options within the display view 111 of the display assembly 110. In other words, the display assembly intermittently 110 presents the GUI 122 to a user via the display view. The information provided by the GUI 122 may include any of: a product, at least one produce item, a purchase transaction, a product scan, debug status, and a product weight determination. The GUI 122 may accept user input confirming any of: a product presented for a transaction, the weight of produce, the operability of the imaging device 102, the status of a transaction, and the like. Alternatively, or additionally, the GUI may provide purely informational views that are interspersed with views that request user input.

Interleaving the activation of the illumination assembly 114, imaging assembly 108, and display assembly 110 may be necessary because there is a need to ensure that the field of view for the imaging assembly is not occluded. Coordinating the activation of the display view 111 of the display assembly 110 and the imaging assembly 108 may be needed because the location of the display view 111 may impinge upon the part of the portion of the exit window 252 that is in the path of the field of view (FOV) of the imaging assembly 108. Consider that the exit window 252 has multiple portions, and a first portion of the exit window 252 is consumed by the display view when the display assembly is active. A second portion of the exit window 252 is consumed by the field of view of the imaging assembly 108.

In this way, the display assembly 110 is capable of alternating between a first and a second state. In the first state, the display assembly 110 generates a GUI in the display view 111. In the second state, not GUI is presented in the display view 111. That is, in the second state, the display assembly 110 is transparent or translucent for allowing images to be captured by the imaging assembly 108. The second state may include the presentation of an image, text, and a status statement via the display view or another view which does not require user input in some implementations. Alternatively, or additionally, the second state may include the absence of any action being taken by the display assembly 110 while the imaging assembly or illumination assembly are active. In other words, during the second state, the display assembly may be configured to present a transparent, or at least partially transparent, display.

Alternating between the first and second states may be activated by a trigger. In some examples, alternating between the first and second states may be based on a positive dwell time of an object in a scanning region 180. The threshold for the positive dwell time, or a threshold wait time, may be a predetermined time or it may be calculated by the controller 117 of the imaging device 102.

In addition to alternating between the first and second states, a focal point of a camera or cameras (imaging sensors 482) associated with the imaging assembly 108 is located a predetermined distance away from the exit window, into the imaging FOV. The focal point is selected such that plane of the exit window is out of focus, or blurry, compared to indicia or images captured near the focal point. In other words, a view displayed on the exit window is perceived by the imaging sensor as being blurry when the focal point of the imaging sensor is selected to be a sufficient distance from the exit window. Configuring the imaging device in this way reduces the interference of irregularities (e.g., fingerprint smudges, scratches) or views displayed on the exit window when capturing and interpreting image data. Alternatively, such a relative configuration between the focal point of the imaging sensors and the exit window may be used in place of switching between the first and second states.

Taking the constraints on the space and possible configurations of the imaging device 102 into account, the touchscreen/display application includes an interleaving application that enables the operation of the imaging device 102 to both identify products and present information to a user while maintaining the traditional footprint or form factor of the imaging device 102. This maintenance of the traditional footprint allows for adoption of imaging devices with the features described herein without extensive alteration of existing POS stations, and provides easy integration and adoption of these imaging devices.

Figure 8:
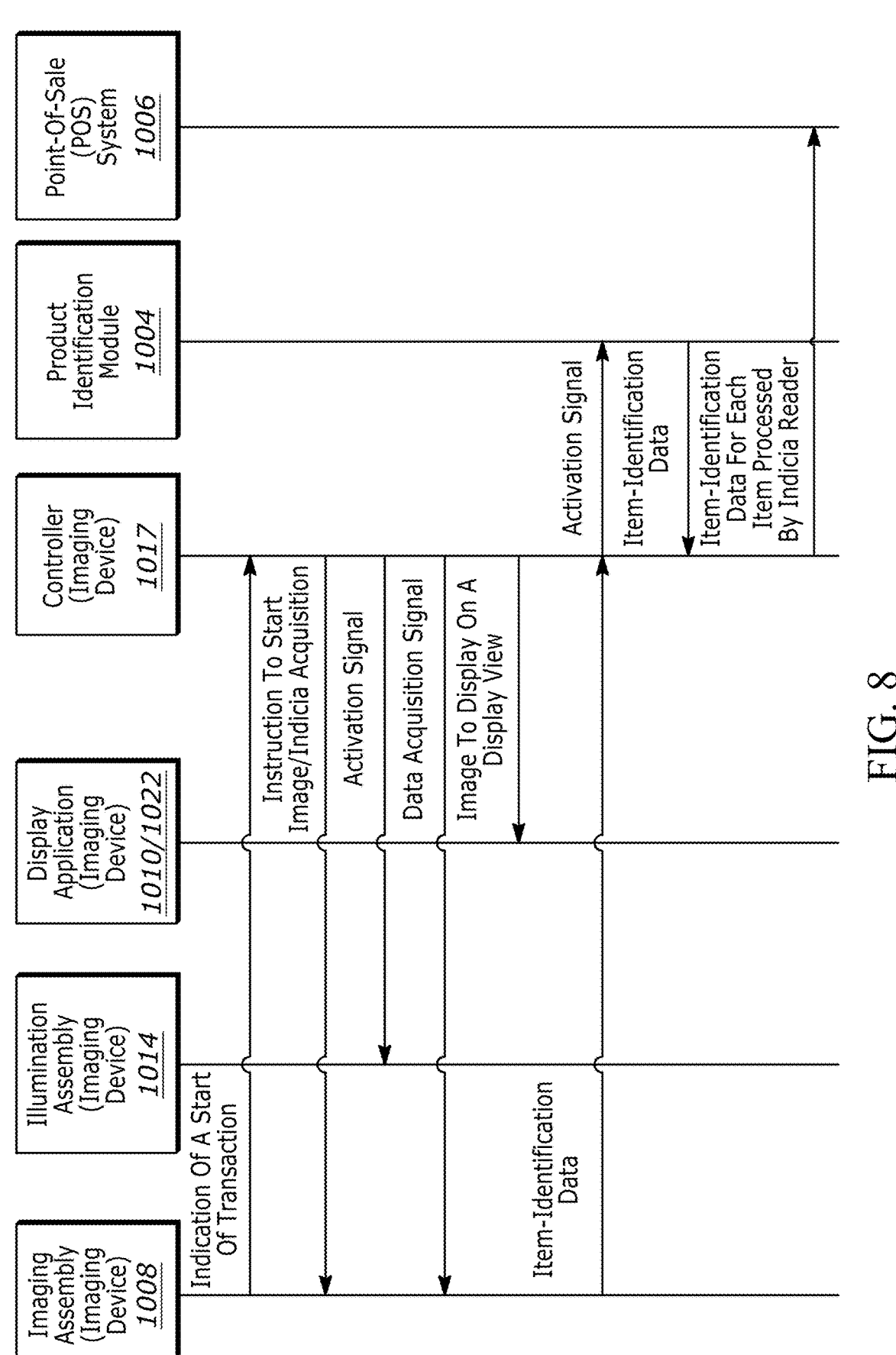
FIGS. 8, 9, and 10 illustrate example data exchanges as may be implemented by the system of FIG. 1, for implementing example methods and/or operations described herein.
Figure 9:
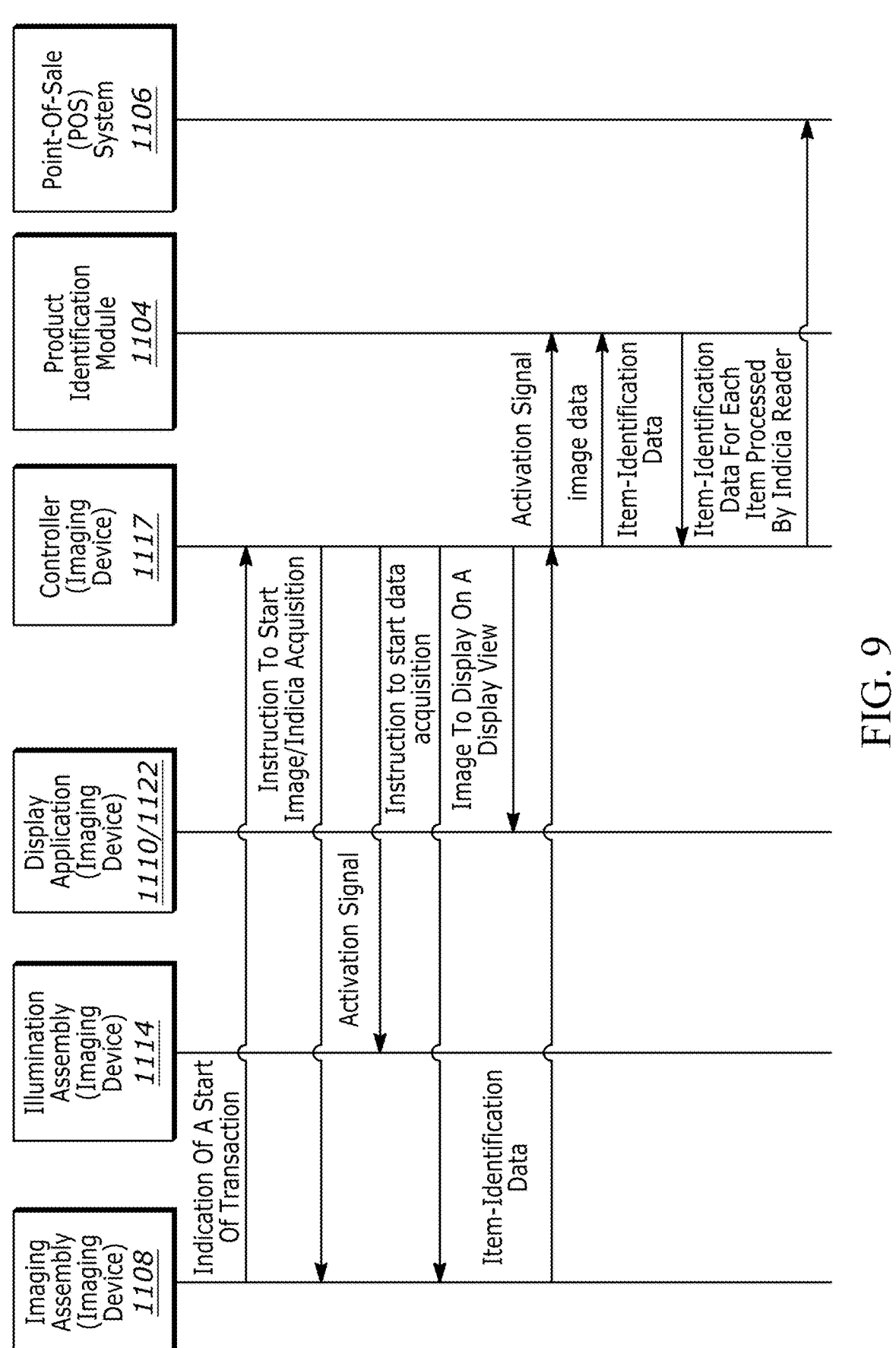
Figure 10:
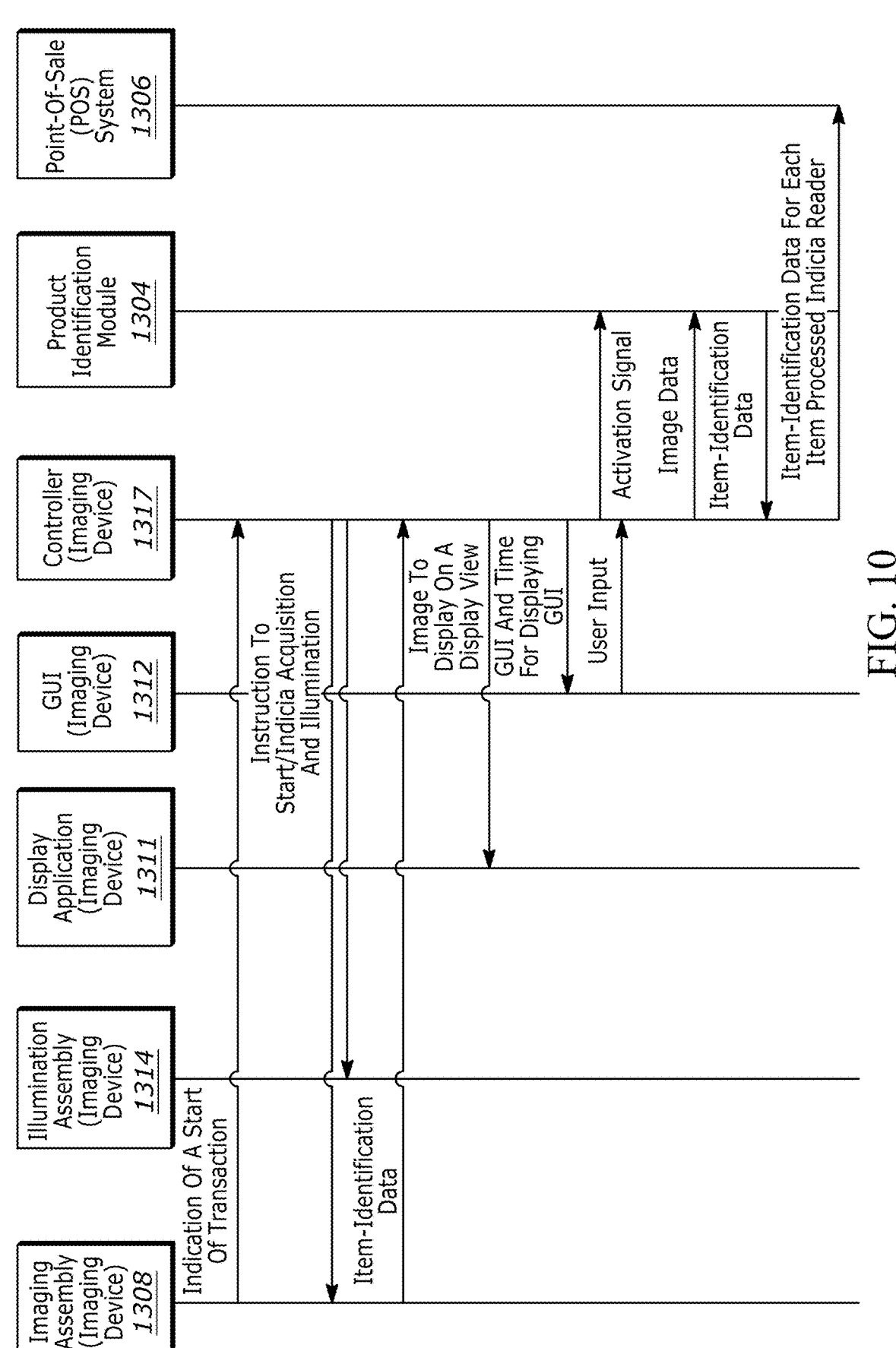

Turning now to FIG. 8-10, in which components of the system 100 are shown at the top of the figure and types of data are shown as being transmitted or sent from one component to another.

In FIG. 8, an imaging assembly 1008, illumination assembly 1014, display application 1022 and display assembly 1010, and controller 1017 associated with the imaging device are in communication with each other as well as with a product identification module 1004 and a point-of-sale (POS) system 1006, with the connection to the identification module and POS system 1006 being through the network (107 in FIG. 1). Optionally the product identification module 1004 is part of the imaging device. A transaction begins with an indication of a start of transaction being sent from the imaging assembly 1002 to the controller 1017. Then the controller 1017 sends an activation signal 1107 to the illumination assembly 1014, and shortly thereafter the controller 1017 sends instructions to start image/indicia acquisition to the imaging assembly 1008. The imaging assembly 1008 then sends item-identification data to the controller 1017, and shortly thereafter, or at substantially the same time, the controller 1017 sends an activation signal to the product identification module 1004 along with item-identification data. The processors 118 of the controller 1017 execute instructions which enable the controller 1017 to send an image to display on a display view. The product identification module 1004 sends item-identification data to the controller 1017. The processors 118 of the controller 1017, after receiving the item-identification data, execute instructions to send item-identification data for each item processed by the imaging device to the POS system 1006. In some implementations, both the item identification module 1004 and POS system 1006 shown in FIG. 8 are operably connected to the imaging device via a network.

FIG. 9 illustrates a data flow similar to that shown in FIG. 8, with the added interaction of the controller 1117 sending image data to a remotely located product identification module 1004 via the network prior to the product identification module 104 sending item identification data to the controller 1117. In some examples, the item-identification data sent by the item identification application 1126 and the item-identification data sent by the controller 1117 may be distinct data sets. In other examples, the item-identification data sent by the item identification application 1126 and the item-identification data sent by the controller 1117 may be redundant or may have redundancy in some of the data transmitted to the POS system 1106.

FIG. 10 illustrates a data flow that is similar to that shown in FIG. 9, with the addition of a GUI and touchscreen display application 1322, as well as the replacement of the display application 1122 with a passive display 1311 (i.e., display view). In FIG. 10, there is the transmission of a graphical user interface (GUI) along with the time to display the GUI which is from the controller 1317 to the GUI/touchscreen display application. This occurs after the controller 1317 sends an image to display to the passive display/display view 1311. After the GUI is sent for presentation to a user for the indicated time, user input is sent from the GUI 1312 to the controller 1317. In the data flow shown in FIG. 13, the product identification module 1304 and the POS system 1306 are in communication with the imaging device 102 and its components via the network, though in some implementations the product identification module 1304 is located on the imaging device 102. The indicated time may be a predetermine time period or a time period calculated by the controller 1317 based on a trigger.

Figure 11A:
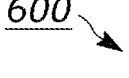
FIGS. 11A-11D illustrate views of images and graphical user interfaces displayed on a display view presented to a user in accordance with the techniques provided herein.
Figure 11A:
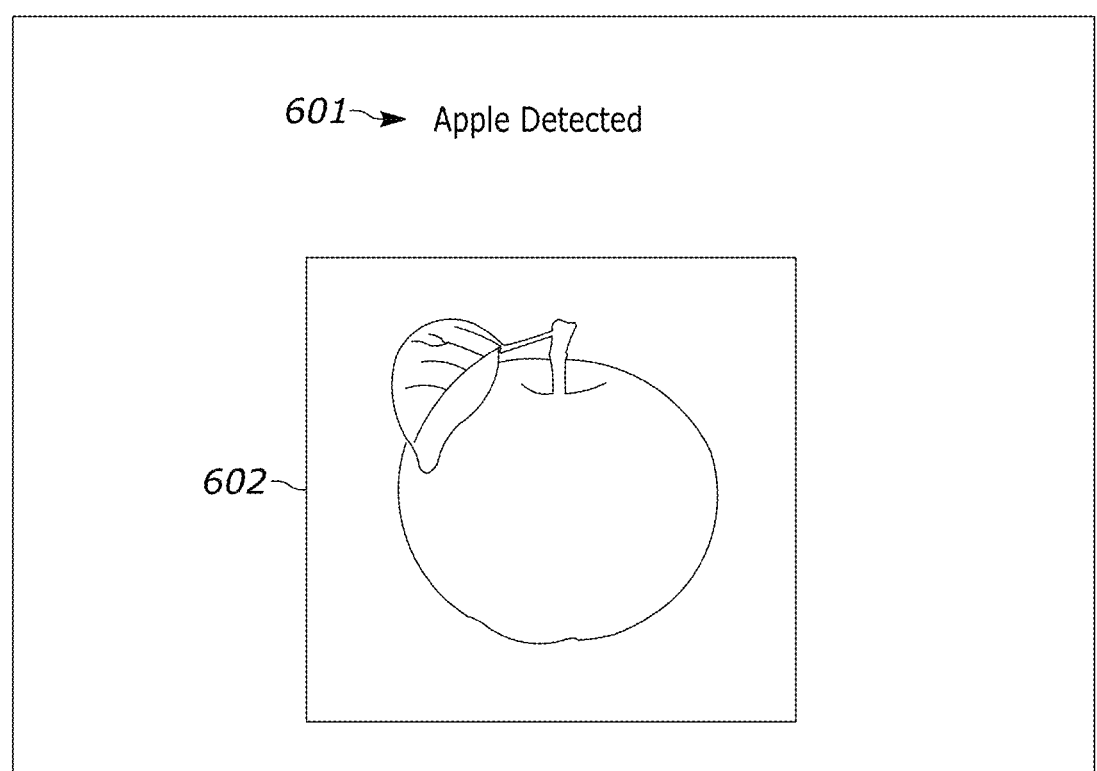

FIG. 11A-11D are example images which may be presented to a user by the display assembly (110 in FIG. 1). An example image includes a status or identification statement 601, as in FIG. 11A. In this example, the statement 601 is "Apple detected." This statement 601 indicates that the imaging device (e.g., indicia reader, barcode reader) 102 believes that a user has presented an apple for purchase during the transaction based on an indicia and/or image data of the produce. FIG. 11A also shows an image 602 conveying information related to the statement 601. In this example, the image 602 shows an apple. The elements in the example image 600 are static. That is to say that in the image 600, tapping or attempting to select any of the elements of the image will not result in any acknowledgment or registering of user input, nor will such tapping motions cause the image to change.

Figure 11B:
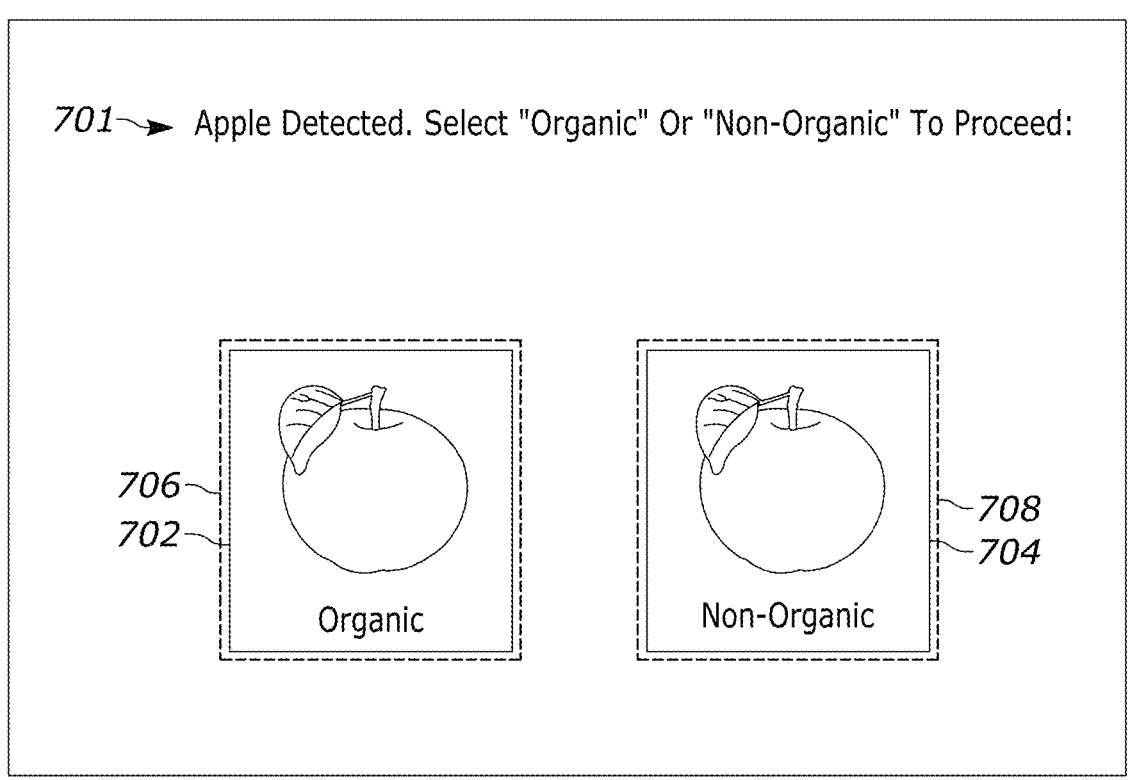

Turning to FIG. 11B, which may be a follow-up screen 700, subsequent to image 600, the screen 701 is presented to a user within the display view of the imaging device. The follow-up screen 700 may have some dynamic features or features which may register user input. This screen 700 presents a GUI. There is a status statement 701 with instructions to the user for proceeding with a transaction. The GUI presented to the user includes images or icons 702, 704 which may be selected by the user. In the example shown in FIG. 11B, the GUI presents an organic apple icon 702 to indicate organic apples and a non-organic apple icon 704 indicating a conventional, non-organic apple. The screen 700 may be presented with the icons 702, 704 covering a portion of the exit window (252 in FIG. 2) that include touchscreen areas 112. In FIG. 11B, the responsive areas 706, 708 are indicated by dashed lines. These responsive areas 706, 708 are slightly larger than the icons, accommodating imprecise tapping or contact from the user. The areas enclosed by the responsive areas 706, 708 are located within the borders of the touchscreen.

Figure 11C:
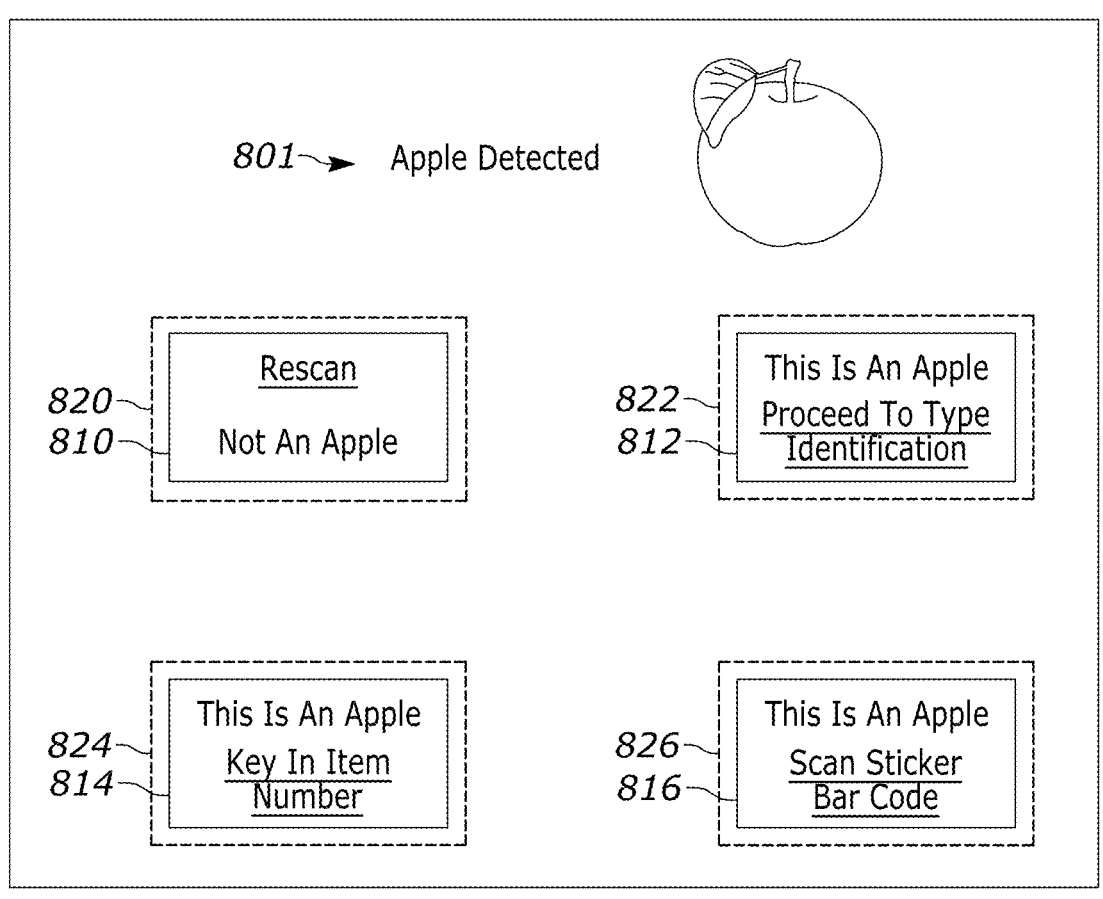

FIG. 11C shows an alternate example of a view 800. The view 800, or screen, includes an example status statement 801 which reads "Apple Detected." An icon of an apple is included in the status statement, but this icon is not required. The status statement 801 and icon may change depending on the produce or item determined by preliminary identification by the imaging device. There are multiple options which will advance the transaction presented in the GUI shown. These presented options 810, 812, 814, 816 reflect possible user input. The user input may dictate which GUI is next presented to the user and how the transaction proceeds. The icons (810, 812, 814, 816) shown in 11C are positioned similar to those in FIG. 11B with respect to the touchscreen and responsive areas.

Figure 11D:
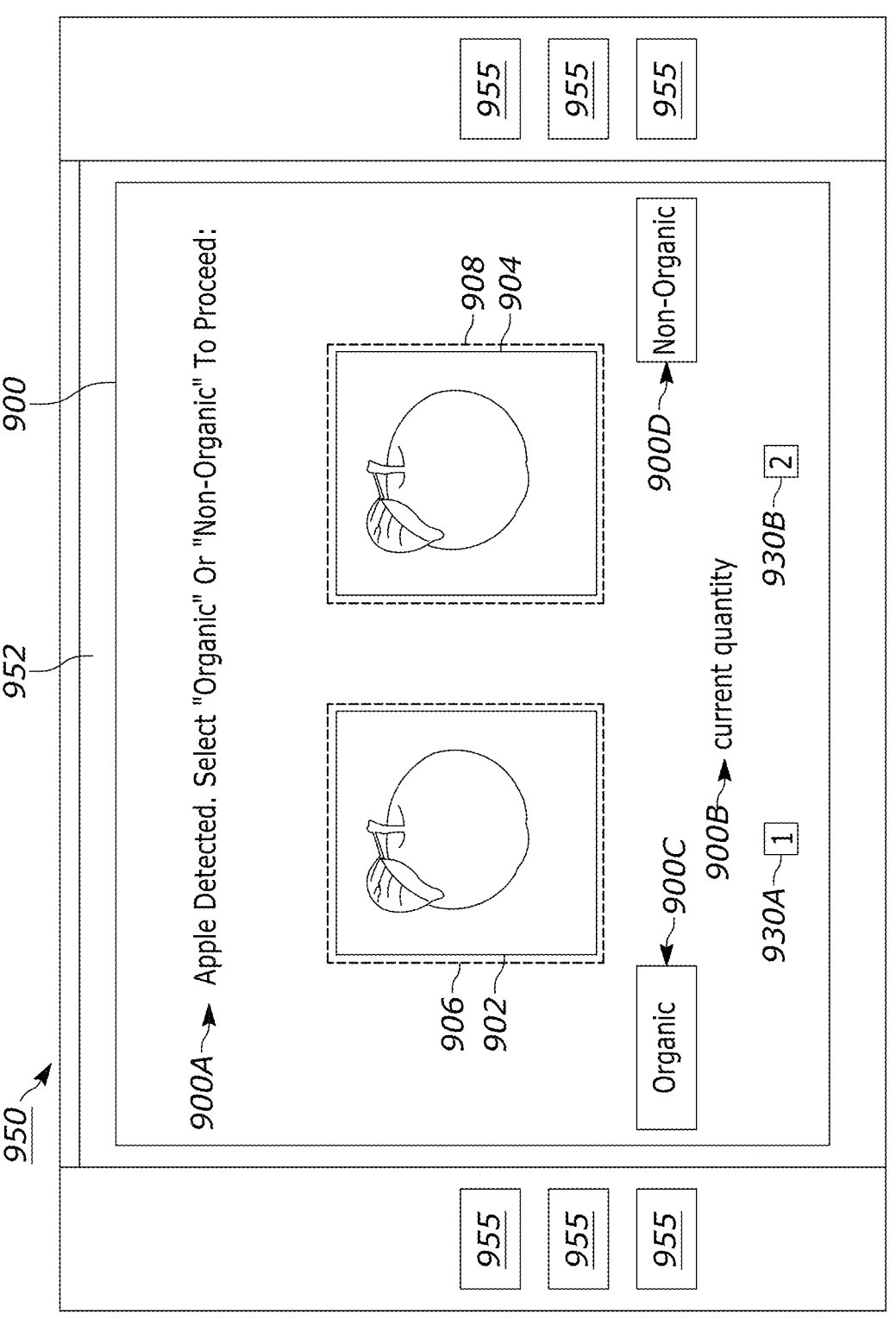

An example of an upper housing 950 of an imaging device with a view 900 is shown in FIG. 11D. This view 900 is similar to that shown in FIG. 11B, having a status statement 900A and icons 902, 904 which are overlaid onto responsive areas 906, 908, with the responsive areas 906, 908 located in areas that include portions of a touchscreen of the imaging device. Additionally, the view 900 includes additional status statements 900B, 900C, 900D and fields 930A, 930B which update in response to user input. The status statement 900A of this view 900, when taken in light of the icons and fields presented, prompts the user to indicate the item type. In return, the GUI updates a quantity number of the type of item in the dynamic fields 930A, 930B. The view 900 is shown on part of an exit window 952, and physical buttons 955 flank the window 952 to the right and left. The physical buttons may correspond to virtual buttons 900C, 900D displayed by the GUI.

The response or selection by the user in response to the GUIs presented, as shown in FIG. 11B, FIG. 11C, and FIG. 11D, may be forwarded to an item identification application (126 of FIG. 1) of the imaging device 102 or product identification module 104 of the system 100 to determine the next steps in the transaction being conducted at the imaging device 102. Further, the information regarding the options presented to the user and the response received may be used to train a machine learning application 134 of the product identification module 104.

FIG. 12 and FIG. 13 are block diagrams showing example methods for use with the systems and apparatus described herein. FIG. 12 illustrates a method 1400 in which information is displayed to a user and items are identified in a transaction, such as during a grocery store purchase. In the step 1402, the controller (117 in FIG. 1) receives an indication of the start of a transaction from the imaging device 102. For example, the indication of the start of the transaction may come from the imaging assembly 108 as an item is placed in the scanning region 180 of the imaging device 102. In step 1404, the controller 117 sends an image to display on a display view 111 of the imaging device 102. The image displayed on the display view 111 may be an initial view that is presented until a transaction begins by a user presenting a product for identification or by a user providing input to the imaging device 102. The controller 117 may send an image to display by executing the touchscreen display application 122. Following this, the display assembly 110 of the imaging device 102 may present the image on the display view 111. Step 1406 includes the sending of an indicator to activate the illumination assembly 114 before activation of the product identification module 106 or an item identification application 126. In this method, the illumination assembly 114 is activated so that an image may be captured of the item to be identified. Image capturing by the imaging assembly 108 takes place following, or at the same time as, illumination. The captured image or images are sent to either, or both, the product identification module 104 via the network 107 or to the controller for processing by the item identification application 126. Following that, the controller 117 may receive an item-identification data, such as from an application of the imaging device 102 as described in step 1408. The item-identification data may be provided by the execution of one of the applications stored on the memory 120 of the controller 117, such as the item identification application 126. Once the item has been identified, the controller 117 sends item-identification data for each item processed by the imaging device to a point-of-sale (POS) module 106, as shown in step 1410. The POS module 106 may be in communication with the imaging device 102 via the network 107. Alternatively, a POS module may be integrated into the imaging device 102 and data between the controller 117 and the POS module may be exchanged via one or more busses of the imaging device 102.

FIG. 13 shows a method 1500 for identifying items during a transaction. In the method 1500, the steps 1502, 1504, 1506, 1508 are similar to the initial steps of the method 1400. The method 1500 begins with the controller receiving an indication of a start of a transaction in step 1502. From that point, the method progresses to the controller sending an image to display on the display view in step 1504, and then to step 1506 in which an indicator to activate the illumination assembly 114 before activating the product identification module 104 is received. At this point, the method includes sending image data to the controller in step 1508. Following this, the method includes the product identification module 104 accepting image data for each item in a transaction, as in step 1510. In response to receiving image data, a GUI may be generated and sent from the touchscreen display application 122 to the display assembly 110. The controller 117 may also send a dwell time for displaying the GUI to the user, as in step 1512. User input is received via the GUI in step 1514. The GUI is presented to the user by the display assembly 110 on a display view 111, which, as described above covers a portion of the exit window that includes a touchscreen which is configured to register touches or other tactile input. Alternatively, physical buttons on the imaging device 102 may be used to register user input. The user input can be used to confirm the type of item presented to the imaging device during a transaction, for example by selecting a correct item from a list of possible matches. The user input leads to the compilation of item-identification data which is sent from the product identification module to the controller as in step 1516. The product identification module may associate the item-identification data with information regarding the price of an item, any special conditions associated with the purchase of the item at that time (e.g., special pricing or available coupons), before passing the information to a POS system or module. In step 1518, the controller 117 sends item-identification data for each item processed by the imaging device 102 to the POS system or module 106.

In the methods described herein, data or information indicated as being sent or exchanged between components, applications, or modules of the imaging device 102 may be sent using one or more busses.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device"can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device comprising:
a housing having an exit window;
an imaging assembly having a first imaging sensor, the imaging assembly having a first field of view (FOV) directed through the exit window; and
a display assembly positioned to generate a display view through the exit window and positioned such that the display view is positioned to consume a first portion of the exit window that at least partially overlaps with a second portion of the exit window consumed by the first FOV,
wherein the display assembly is configured to alternate between a first state and a second state, the first state includes presenting a graphical user interface (GUI), the second state includes not presenting the GUI, and the display assembly is configured to capture image data over the second portion of the exit window during the second state,
wherein the housing has (i) a lower housing portion with an upper surface facing a product scanning region, a substantially horizontal window, and a weigh platter, and (ii) an upper housing portion extending above the lower housing portion with the exit window, wherein the exit window is a substantially upright window, and wherein the imaging device is configured to alternate between the first state and the second state based on a positive dwell time signal from a weigh platter.

2. The imaging device of claim 1, wherein the display assembly is configured to display the GUI to a user within the display view of the display assembly, wherein the GUI comprises information pertaining to any of: a product, at least one produce item, a purchase transaction, a product scan, debug status, a product weight determination, and machine vision application, wherein the display assembly is further configured to accept a user input.

3. The imaging device of claim 2, wherein the display assembly is configured to intermittently present the GUI to the user.

4. The imaging device of claim 1, wherein the display assembly is configured such that the display view is at least partially transparent during the second state.

5. The imaging device of claim 4, wherein the display assembly is further configured to intermittently accept input from a user via the GUI presented in the first portion of the exit window.

6. The imaging device of claim 1, further comprising a touchscreen configured to accept user input from a GUI presented in the first portion.

7. The imaging device of claim 1, wherein the display assembly is configured to alternately display information to a user in the first portion of the exit window, further wherein the imaging assembly is configured to capture item-identification data through the second portion of the exit window and/or provide illumination to the first FOV through the first portion of the exit window.

8. The imaging device of claim 1, further comprising an illumination assembly configured to provide illumination over the FOV.

9. The imaging device of claim 1, wherein the exit window of the display assembly includes any of: a capacitive touchscreen, an array of transparent touch sensors, a grid of printed nanowires on a transparent sheet, frosted elements applied to the exit window, and markings applied on a bezel at edges of the exit window.

10. The imaging device of claim 1, wherein the display assembly is adjacent to the exit window.

11. The imaging device of claim 1, wherein the display assembly is a backlit display assembly, edge lit display assembly, or projection-based display assembly.

12. The imaging device of claim 1, wherein the display assembly is switchable between translucent, opaque, semi-transparent, and/or transparent modes.

13. The imaging device of claim 1, wherein the display assembly is controllable to interleave a display within the display view with (i) exposure of sensors of the imaging assembly and/or (ii) illumination from an illumination assembly of the imaging device.

14. The imaging device of claim 1, wherein the imaging device is a slot scanner, kiosk scanner, or bioptic scanner.

15. The imaging device of claim 1, wherein the housing has (i) a lower housing portion with an upper surface facing a product scanning region and a substantially horizontal window and (ii) an upper housing portion extending above the lower housing portion with the exit window, wherein the exit window is a substantially upright window.

16. The imaging device of claim 1, wherein a focal point of the first imaging sensor is a predetermined distance away from the exit window into a the first FOV so that a view displayed on the exit window is perceived by the first imaging sensor as being blurry.

* * * * *